United States Patent
Nagata et al.

(10) Patent No.: US 6,212,443 B1
(45) Date of Patent: *Apr. 3, 2001

(54) TEACHING UNIT FOR ROBOTS

(75) Inventors: Hideo Nagata; Youichi Tanaka; Yasuyuki Inoue; Hirotaka Morita, all of Fukuoka (JP)

(73) Assignee: Kabushiki Kaisha Yaskawa Denki, Kitakyushu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,856
(22) PCT Filed: Sep. 13, 1996
(86) PCT No.: PCT/JP96/02638
§ 371 Date: Mar. 16, 1998
§ 102(e) Date: Mar. 16, 1998
(87) PCT Pub. No.: WO97/10080
PCT Pub. Date: Mar. 20, 1997

(30) Foreign Application Priority Data

Sep. 14, 1995 (JP) .................................. 7-262327
Sep. 20, 1995 (JP) .................................. 7-267916
Nov. 29, 1995 (JP) .................................. 7-335961

(51) Int. Cl.[7] ................................. G06F 19/00
(52) U.S. Cl. ...................... 700/245; 700/63; 700/258; 318/568.13
(58) Field of Search .................................. 700/63, 64, 65, 700/245, 250, 253, 254, 257, 260, 261, 264; 318/568.13, 568.11, 568.16, 568.22, 568.23; 901/3, 4

(56) References Cited

U.S. PATENT DOCUMENTS

| | | | |
|---|---|---|---|
| 4,442,387 | * 4/1984 | Lindbom | 318/568.13 |
| 4,458,321 | * 7/1984 | Whitney et al. | 700/258 |
| 4,592,697 | * 6/1986 | Tuda et al. | 414/719 |
| 4,608,651 | * 8/1986 | Murakami et al. | 700/250 |
| 5,051,675 | * 9/1991 | Okumura et al. | 318/568.1 |
| 5,509,847 | * 4/1996 | Jinno et al. | 451/11 |
| 5,590,244 | * 12/1996 | Nakata et al. | 700/260 |

\* cited by examiner

Primary Examiner—William Grant
Assistant Examiner—Kidest Bahta
(74) Attorney, Agent, or Firm—Oblon, Spivak, McClelland, Maier & Neustadt, P.C.

(57) ABSTRACT

A direct teaching apparatus which allows an operator to perform the direct teaching of a robot in safety. The apparatus includes a force detector and a teaching tool. The tool includes a working tool or handle fixed to the first detector and held by the operator to lead the robot. It also includes a device for computing the position or speed directive based on the force detector data and a motion model. It further includes a device for computing the generation torque of a motor for driving a robot depending on the position or speed directive and a controller to control the generated torque.

14 Claims, 22 Drawing Sheets

TEACHING UNIT FOR ROBOTS

BACKGROUND OF THE INVENTION

1. Field of the Invention

The present invention relates to a teaching apparatus for teaching data with reference to a working point to such as an industrial robot, more particularly to a teaching apparatus which is improved in safety.

2. Discussion of the Background

As a conventional zeaching method for teaching data of a working point to an industrial robot, there is a direct teaching method, as disclosed in J.P.A. Gazette 85106/1981, in which a force sensor is provide as a teaching tool in a manual operation part of the industrial robot, each driving unit for driving an industrial robot is controlled according to directives showing positional data of a tip and attitude data of a wrist of the robot which are indicated by signals generated by the force sensor at the time when an operator operates the manual operation part to lead the position of the tip and the attitude of the wrist of the robot, and thus the data (lead data) controlling each driving unit are stored in a memory.

Further, in a method disclosed in J.P.A. Gazette 71086/1983, teaching tool 221 having a built-in force sensor is attached to the tip of robot 211 as shown in FIG. 1, and force control is performed corresponding to the force or the moment which is applied to teaching tool 221, when operator 214 directly manipulates teaching tool 221, and thus the position or the speed of the robot is controlled for leading a working tool of the robot. When performing teaching, operator 214 instructs the start and termination of teaching by manipulating many switches provided in teaching tool 221.

Different from the direct teaching method as above, there is an indirect teaching method as shown in FIG. 2, in which operator 214 manipulates teaching manipulator 220 provided with manipulation switches for teaching the motion of the robot to lead robot 211.

Conventional examples shown in FIG. 1 and FIG. 2 each shows the same example in which cylindrical tube 213 is welded on a flat plate.

Among the conventional examples shown above, the method disclosed in J.P.A. Gazette 85106/1981 has a risk such that, if the operator stumbles during teaching and leads the teaching tool with excessive foe or makes the teaching tool contact the work or other obstruction, excess force is applied to a force detector and then abrupt motion of the robot is caused due to the excessive torque thus generated.

Or, in case the operator is caught between the arms of the robot or between the arm and the work while he is leading a teaching tool and the robot is generating power in the direction of applying force to the operator standing therebetween, it is hard for the operator to escape from this state.

Further, even when the operator detects danger during direct teaching, he will be unable to avoid the danger because he has no means at hand to suddenly stop the motion of the robot.

Still further, when the output from the force detector varies due to a temperature drift or external force is applied to the force detector, a teaching handle is not in a fixed position and there is a danger that a robot may move contrary to the operator's intention. Also when a working tool makes contact during direct teaching operation with the work or other obstruction, there is a danger that the robot may continue to move deforming the working tool.

Moreover, when the operator performs the teaching of a narrow portion of the work, the teaching handle on the working tool becomes an obstrution, thereby causing a danger that the operator's arm may be grasped by the work, and further that the robot may be locked at the time of emergency stop, and in the worst case, the operator may be held in a constrained state being unable to escape therefrom.

With the robot shown in FIG. 1, since the operator performs teaching while manipulating many switches on the teaching tool for leading the robot, the physical/mental fatigue of the operator becomes very large. Further, when one teaching tool is commonly used among a plurality of robots, it becomes necessary to lay the wiring from the teaching tool to respective robot controllers directly thereby requiring a large cost.

Also as for the robot shown in FIG. 2, since the operator leads the robot per each axis or leads in the XYZ direction on the robot coordinate system or on the tool coordinate system through manipulation switches on a teaching manipulator, it is hard to intuitively lead the position or the attitude of the robot or the tool relative to the work, and the large physical/mental fatigue of the operator as well as the prolonged teaching time are required, causing a disadvantage to the person concerned.

SUMMARY OF THE INVENTION

The present invention has been developed in view of the above circumstances. A first object of the present invention is to provide a direct teaching apparatus which can control the motor generation torque within an allowable limit and enables an operator to perform teaching in safety by using a simple teaching apparatus, even if the excessive manipulation force is applied by the operator to a force detector or even if the operator is caught between arms of the robot or between the arm and the work.

Further, a second object of the present invention is to provide an apparatus for teaching a robot which can remarkably reduce the physical/mental fatigue of the operator by decreasing the number of switches on a teaching tool thereby enabling the operator to use both the direct and indirect teaching methods, the teaching apparatus being concurrently made simple with the reduced wiring.

Still further, a third object of the present invention is to provide a direct teaching apparatus which allows the operator to perform the teaching operation in safety even if there is a temperature drift in the force detector or attachment omission of a teaching handle, even if a working tool makes contact with the work or the teaching is made with reference to a narrow portion of the work or even if an emergency stop takes place.

The apparatus for teaching a robot according to the present invention comprises a force detector, a teaching tool composed of a working tool or an handle which is fixed to said force detector and held by the operator for leading the robot, a motion model operation part which serves as a means for computing a position or a speed directive based on data of said force detector and a motion model, a flexible servo system composed of means for computing motor generation torque based on said position data or said speed directive and means for controlling said generation torque, and means for storing directive data with reference to the position, speed or direction.

When the operator performs direct teaching of a working point according to the teaching apparatus structured as above by holding and leading the teaching tool and the simple teaching apparatus, the torque generated by a driving unit is controlled to a minimum amount required for the motion of the arm itself because the apparatus has a function for controlling the motor generation torque, and hence, for example, even if excessive force by the operator is applied to the force detector, there is no danger that the robot may move under the excessive generation torque. Further, even if the operator is caught between the arms of the robot or between the arm and the work, the force holding the operator is not excessively large so that the operator can easily escape by his own force, and accordingly the operator can perform the teaching operation in safety. Also, when the motor generation torque is controlled, sometimes the robot may move without corresponding to the directive data thereby producing a difference between the directive data and the detector data; however, since the apparatus comprises storage means based on the detector data, the robot can move in a playback operation to the working point actually indicated by the operator.

A apparatus for teaching a robot according to another aspect of the present invention comprises a force detector, a teaching tool composed of a handle which is fixed to the detection terminal of said force detector and held and manipulated by the operator, a teaching manipulator in which said teaching tool can be housed or attached thereon, a force detector lead wire connecting said teaching tool and said teaching manipulator, and means for controlling force based on said force detector data.

This teaching apparatus further comprises means for performing direct teaching by separating the teaching tool from the teaching manipulator and attaching to a hand or an arm or a working tool of the robot, and means for performing the indirect teaching by attaching the teaching tool to the teaching manipulator.

Further, if the above teaching apparatus comprises additional means for switching the force control with reference to the manipulation force in the direction of translation and rotation, it becomes possible to perform teaching of a position and an attitude independently, achieving an effective result for the user.

In case of teaching the working point by using the teaching apparatus structured as above, the operator attaches the teaching tool to the hand or the arm or the working tool and the like of the robot and leads the robot in accordance with the manipulation force applied to the handle of the teaching tool and thus performs the teaching of the position and the attitude of the working tool according to the direct teaching method, or the operator inserts the teaching tool in the Leaching manipulator and leads the robot in accordance with the manipulation force applied to the handle of the teaching tool and thus performs the teaching of the position and the attitude of the working tool according to the indirect teaching method. Further, by switching the force control between the manipulation force in the translational direction and the manipulation force in the rotational direction on the teaching apparatus, it becomes possible to perform the teaching of the working tool only for the position or only for the attitude in relation to the work.

An apparatus for teaching a robot according to still another aspect of the present invention comprises a force detector, a teaching handle fixed to said force detector and held by the operator for leading the robot, a motion model operation part serves as a means for computing the position or the speed directive based on the data of said force detector and a motion model, a position/speed servo system for computing motor generation torque based on said position data or said speed directive, and a simple teaching apparatus.

The simple teaching apparatus has input switches for inputting data with reference to positions or the like of the robot and means for expressing the state such as on-off of the servo power, which are both provided thereon.

Further, an apparatus for teaching a robot according to still another aspect of the present invention described above comprises a compliance mechanism which is provided between the teaching handle and the tip of the robot or between the working tool attached with the teaching handle and the tip of the robot, means for changing a signal at the time when said compliance mechanism is subjected to a fixed amount of displacement, and means for stopping the motion of the robot upon receiving said signal.

Also, the above teaching apparatus is structured such that, after the robot is urgently stopped by the electric brake, mechanical braking operation will not be applied to three wrist shafts nor to a shaft which is not subject to gravity.

Further, the above teaching apparatus includes manipulation buttons provided on the teaching handle, means for recognizing that the teaching handle is attached to the tip of the robot or to the fixed place on the working tool, and means for attaching the teaching handle onto said simple teaching apparatus.

Furthermore, the above teaching apparatus is structured such that the handle attachment recognition switch can be manipulated by means or a remote manipulation jig which is used for manipulation when the teaching handle is detached from the robot.

An apparatus for teaching a robot according to still another aspect of the present invention comprises a direct teaching apparatus having a teaching handle disposed on the tip of the robot and a force sensor interposed therebetween detects the force applied to said teaching handle held by the operator by means of said force sensor, and moves the robot arm in the direction of the detected force or teaching the position to which the robot is to be moved, wherein the teaching tool is attached through the compliance mechanism to the tip of the robot and the teaching handle is attached to the tool through the force sensor.

Also in the above direct teaching apparatus, the force sensor and the teaching handle are integrated as a unit which is detachable at the time of playback operation, and the unit detached including the force sensor and the teaching handle is held during the playback operation at the position provided on the robot arm or on the controller.

The compliance mechanism of the present invention is a mechanism which produces a buffering effect such as that of a RCC (Remote Center Compliance) mechanism or a floating mechanism.

By attaching the tool through the compliance mechanism as described above, the flexible motion of the tool portion becomes realized to prevent the damage of the tool and the force sensor at the time of collision, and further when some object strikes the teaching handle or the tool or the instructing operator falls carrying the teaching handle, the compliance mechanism absorbs the impact and prevents an abnormal motion of the robot which may be caused by the excessive load.

Further, when a part of the instructing operator's body is caught between the tool and the robot arm for some reason after the braking action of the control board is started, if the resulting coasting distance is short, the compliance mechanism absorbs the motion energy of the robot thereby preventing an accident of sandwiching the operator.

DETAILED DESCRIPTION OF THE PREFERRED EMBODIMENTS

Next, an embodiment of the present invention will be described with reference to the drawings.

Figure 1:
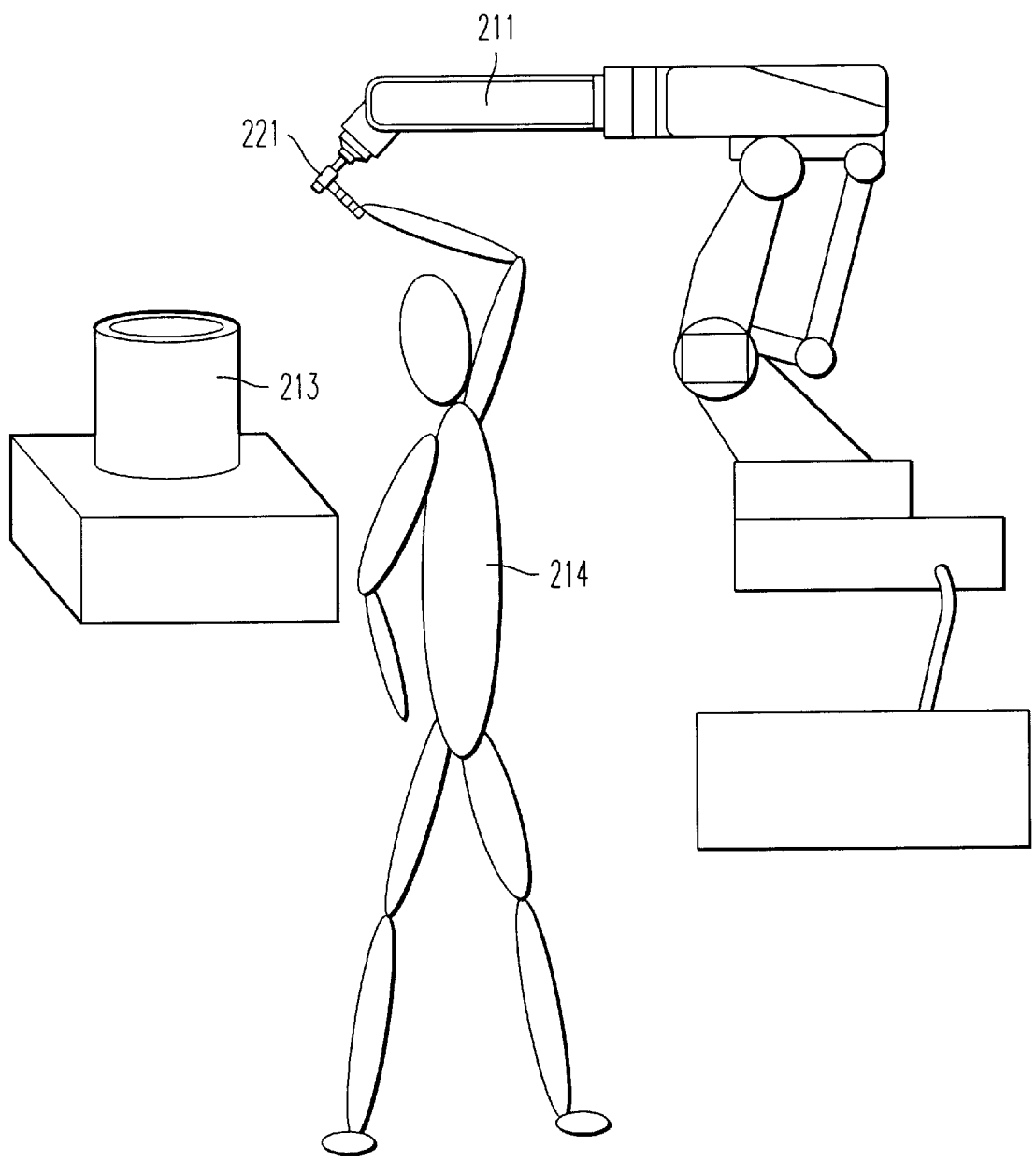
FIG. 1 is a perspective view of a teaching apparatus used in the direct teaching operation performed in the conventional example.
Figure 2:
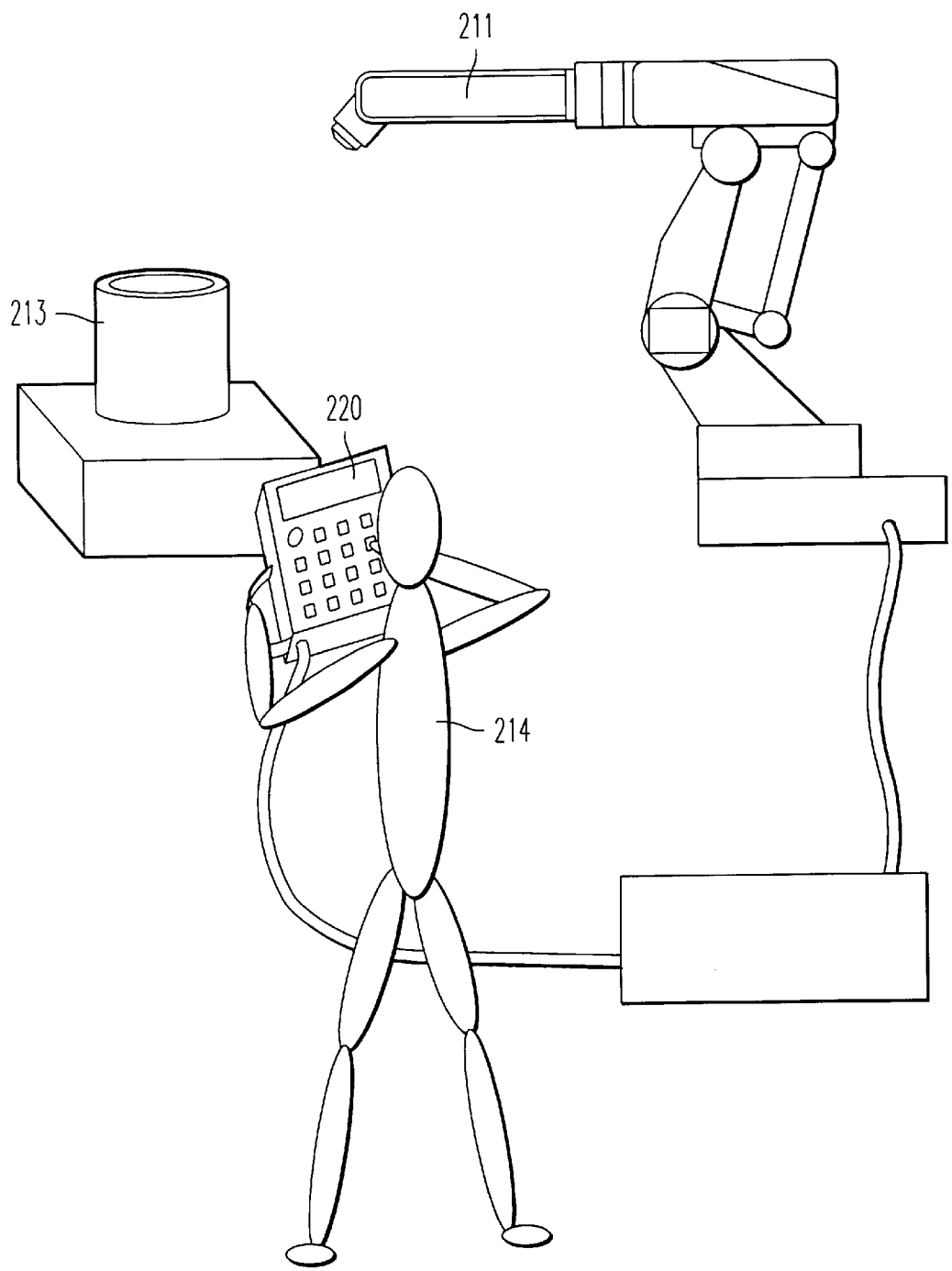
FIG. 2 is a perspective view of a teaching apparatus used in the indirect teaching operation performed in the conventional example.
Figure 3:
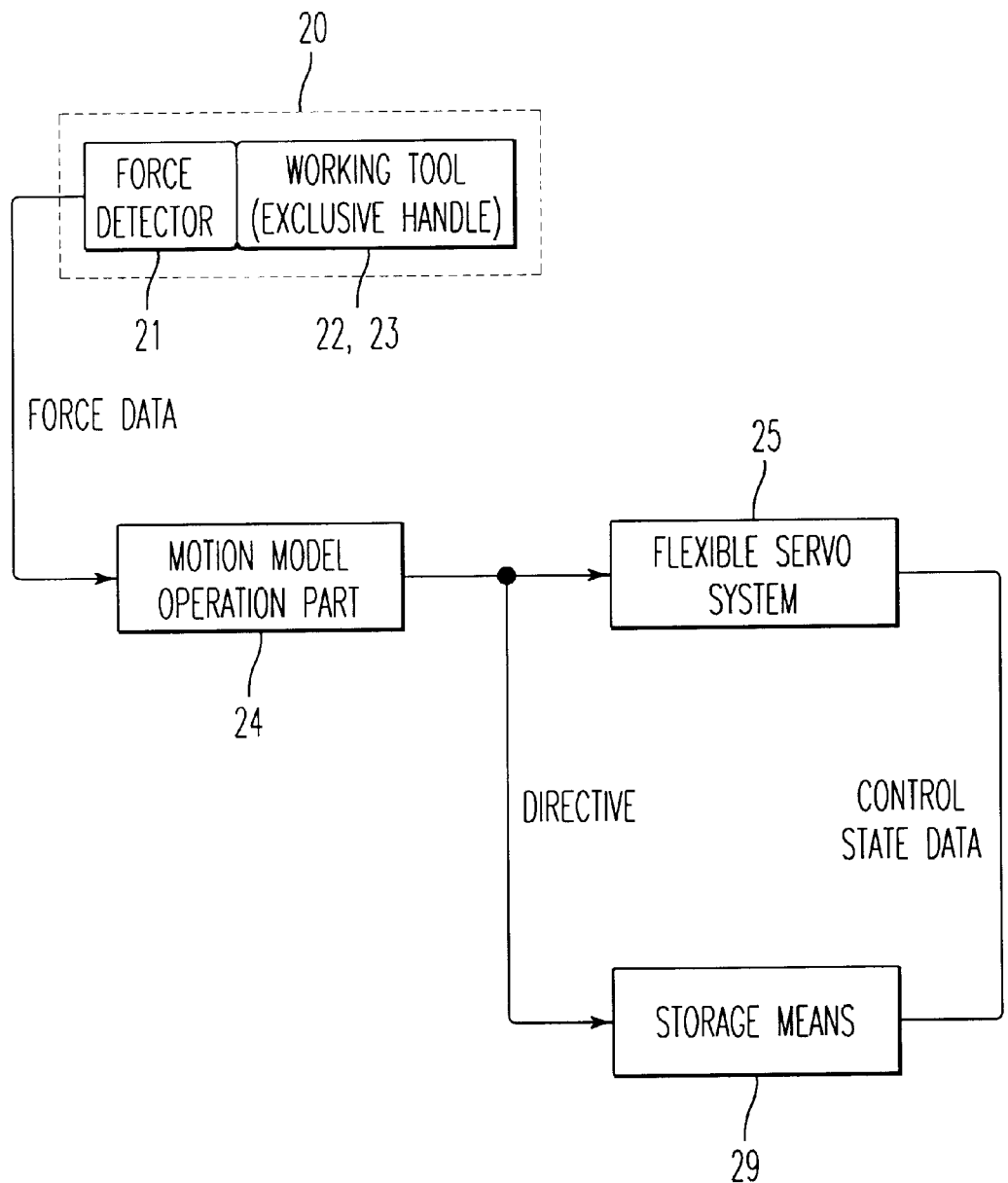
FIG. 3 is a block diagram showing an idea of the present invention.

FIG. 3 is a block diagram showing a structure of an embodiment of a direct teaching apparatus of a robot of the present invention. As shown in FIG. 3, the present embodiment comprises force detector 21, teaching tool 20 composed of working tool 22 (or exclusive handle 23) which is fixed to said force detector and held by the operator for leading the robot, motion model operation part 24 which serves as a means for computing the position or the speed directive based on the output data of force detector 21 and a motion model, flexible servo system 25 composed of means for computing motor generation torque based on said position data or said speed directive data and means for controlling said generation torque, and storage means 29 for storing directive data with reference to the position, speed or direction.

The motion of the present embodiment will be described below.

Figure 4:
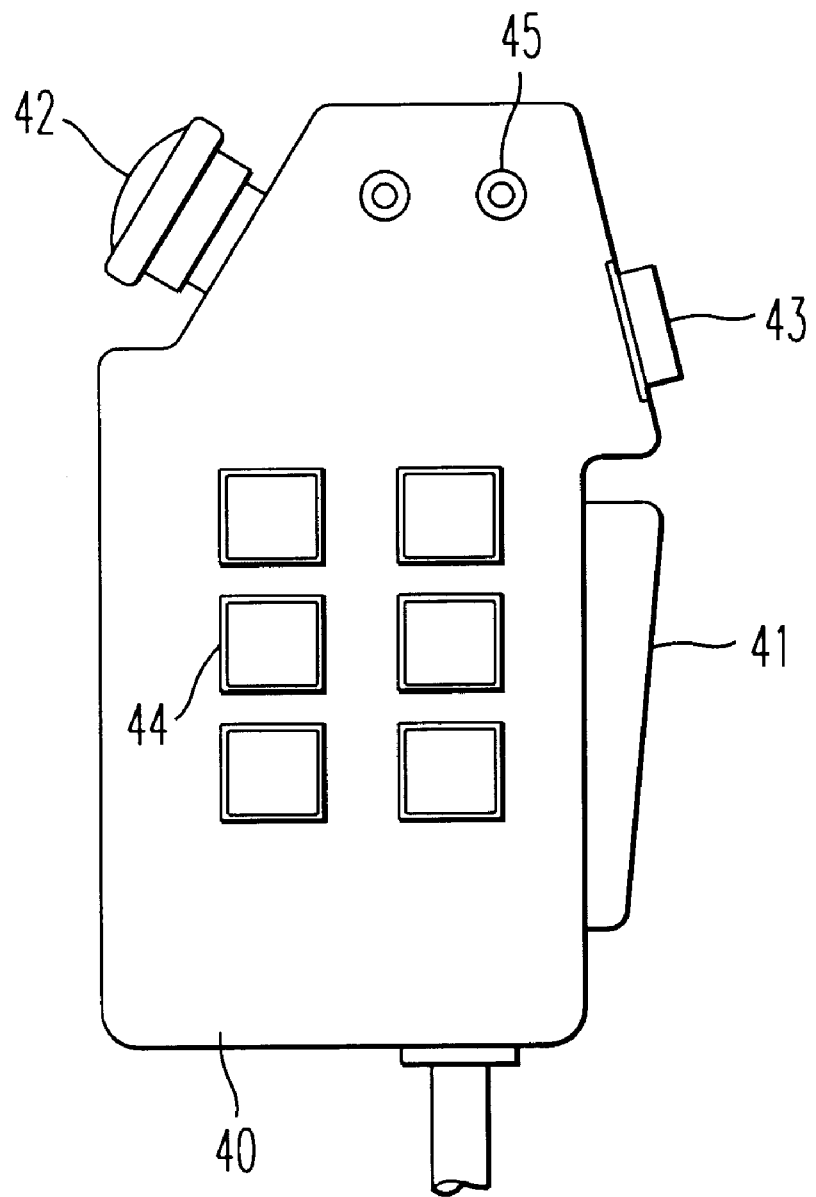
FIG. 4 is a front view of a simple teaching apparatus showing an embodiment of the present invention.

First, a simple teaching apparatus used in the present embodiment for direct teaching as an auxiliary tool will be shown in FIG. 4 and described in advance.

Simple teaching apparatus 40 is of approximately palm size and the operator manipulates each switch holding it by one hand (since the other hand of the operator must hold a later described teaching tool, apparatus 40 must be held by one hand). Here, each switch means servo Dower retention switch 41, emergency stop button 42, input switch 43, memory data editing key 44, and further state indication lamp 45 is also included therein.

Figure 7:
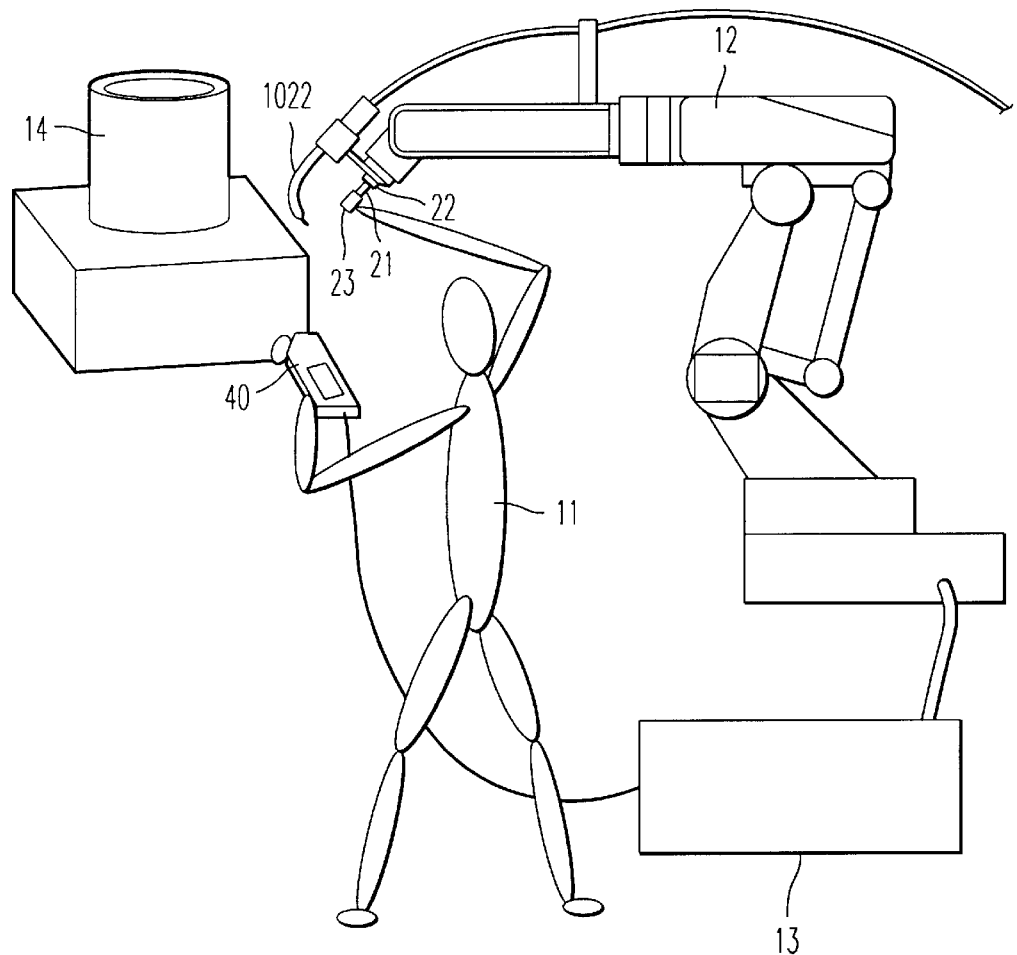
FIG. 7 is a perspective view of a welding work showing another embodiment of the present invention.

Operator 11 shown in FIG. 7 can input the servo power by holding servo power retention switch 41 with a fixed level of force. Also, when operator 11 feels danger during the direct teaching operation, he can stop the motion of the robot by releasing the hold of servo power retention switch 41 or by pushing emergency stop button 42.

In the present embodiment, the position data of the robot is stored only when input switch 43 is pushed. Input switch 43 is pushed every time teaching is finished at each teaching point, and thus each position of the robot at each push time is stored.

Memory data editing key 44 is used for performing editing such as addition, change or erasing of storage data. By using this key, teaching points can be changed with other points.

State indication lamp 45 is a lamp for indicating that teaching is in progress.

Figure 5:
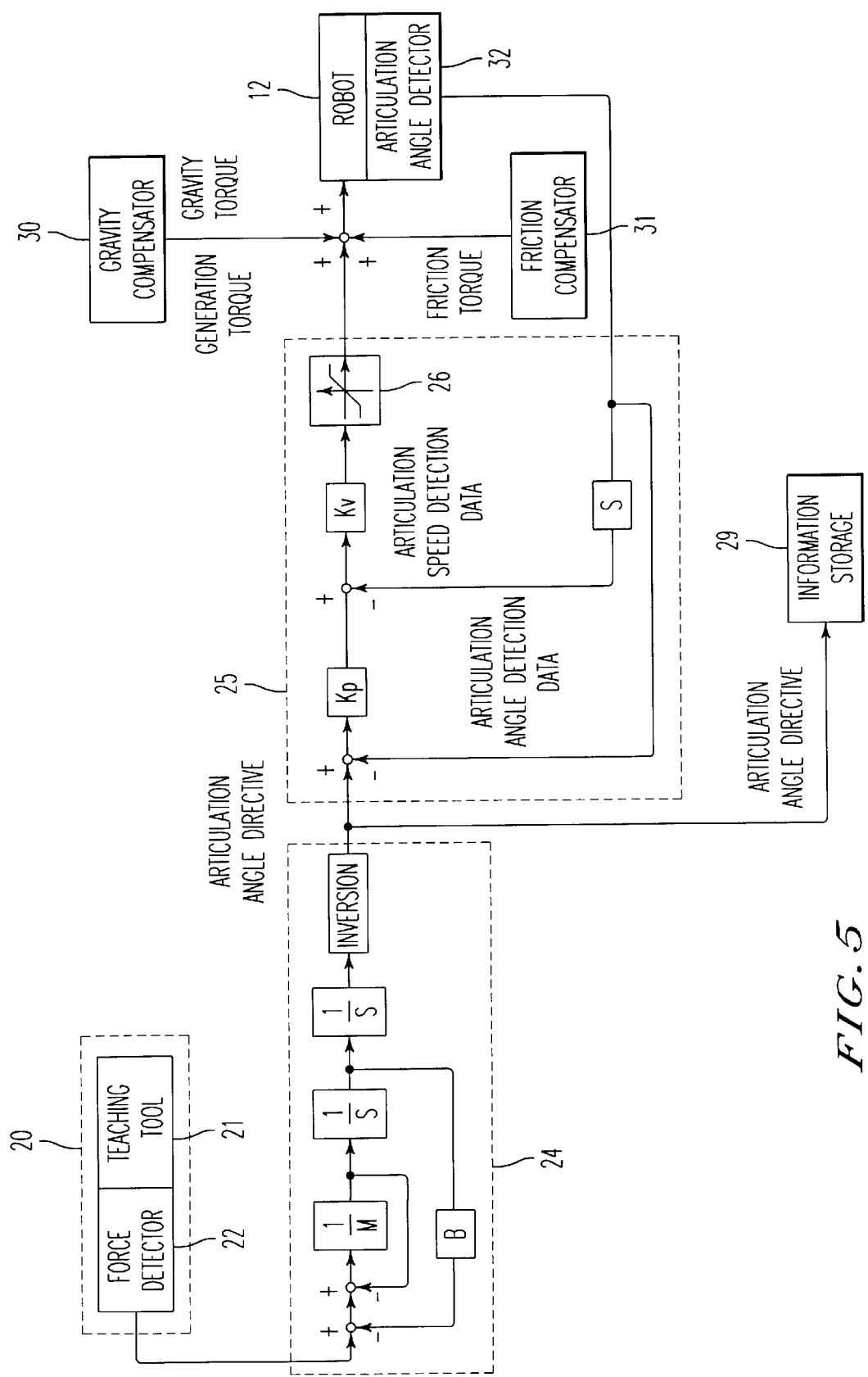
FIG. 5 is a block diagram showing an embodiment of the present invention.

FIG. 5 is a block diagram showing a structure of a control system of the present embodiment. A control method of the present embodiment is structured such that force detector 22 detects the leading force of teaching tool 21 held by the operator, and depending on the detected data, motion model operation part 24 computes the position directive on the rectangular Cartesian coordinate system which is established according to the motion model prepared by using imaginary inertia and viscosity. Motion model operation part 24 further inversely transforms the computed position directive to the data on a revolute type system to obtain an articulation angle directive of each articulation.

Flexible servo system 25 calculates the motor generation torque based on articulation angle directive calculated by motion model operation part 24 and based on the articulation angle and articulation speed detected by articulation angle detector 32 provided on each driving unit or on each articulation part of the robot. Here, in torque limiter 26, limit value of the torque is set which gives a required minimum value for moving the arm of robot 12. By inputting said generation torque to this torque limiter 26, the generation torque is controlled within a safety range. For example, when the operator exerts excessive force on teaching tool 21 and the generation torque calculated by torque limiter 26 exceeds the predetermined threshold, torque limiter 26 controls the generation torque to the minimum value necessary to move the arm of robot 12.

To the generation torque, which is controlled by torque limiter 26 are added, gravity compensation torque which acts on each arm with the value calculated by gravity compensator 30 based on the angle of each articulation, the distance from the center of gravity of each arm to the center of each articulation and the mass of each arm and friction compensation torque which acts on a driving part of each articulation with the value calculated by friction compensator 31 based on the articulation speed of each articulation. Robot 12 is driven by the generation torque which is added with his gravity compensation torque and this friction compensation torque.

When the operator lads robot 12 to a working point of working object 14 (FIG. 7) and pushes input switch 43 (FIG. 4) provided on simple teaching apparatus 40, an articulation angle directive is stored in data storage 29. At the time of playback operation, position control is performed based on the articulation angle directive thus stored.

Figure 6:
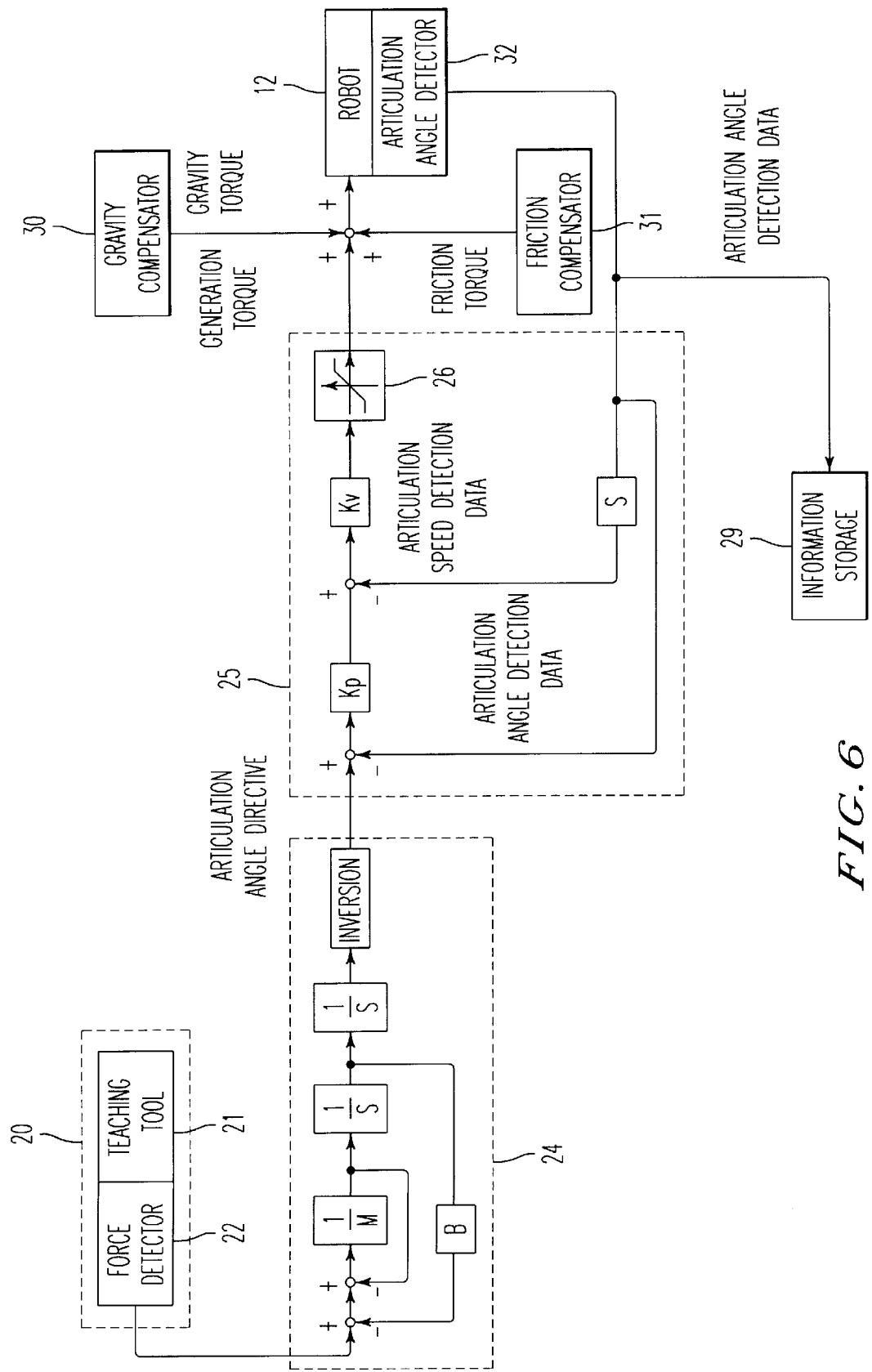
FIG. 6 is a block diagram showing another embodiment of the present invention.

FIG. 6 is a block diagram showing a structure of a second embodiment of the present invention. In the present embodiment, an articulation angle detected by articulation angle detector 32 is stored in data storage 29 and used for playback operation in place of the articulation angle directive.

When torque generation is controlled, sometimes motor generation torque becomes short and robot 12 does not operate as directed, thereby producing a difference between directive data and detector output data. If directive data is stored in data storage 29 (FIG. 5) in this state, robot 12 moves in playback operation to a position deviated from the actual teaching point.

In the present embodiment, by providing data storage 29 (FIG. 6) which uses the detector data, it is arranged so that the robot can move in playback operation to the working point settled at the time when the input switch is actually pushed.

Whether the directive data is stored as in the embodiment shown in FIG. 5 or the detector data is stored as in the present embodiment can be selected according to cares. Further, to meet the above circumstances, a selection switch to select either one of the above two may be added on simple teaching apparatus 40.

Figure 8:
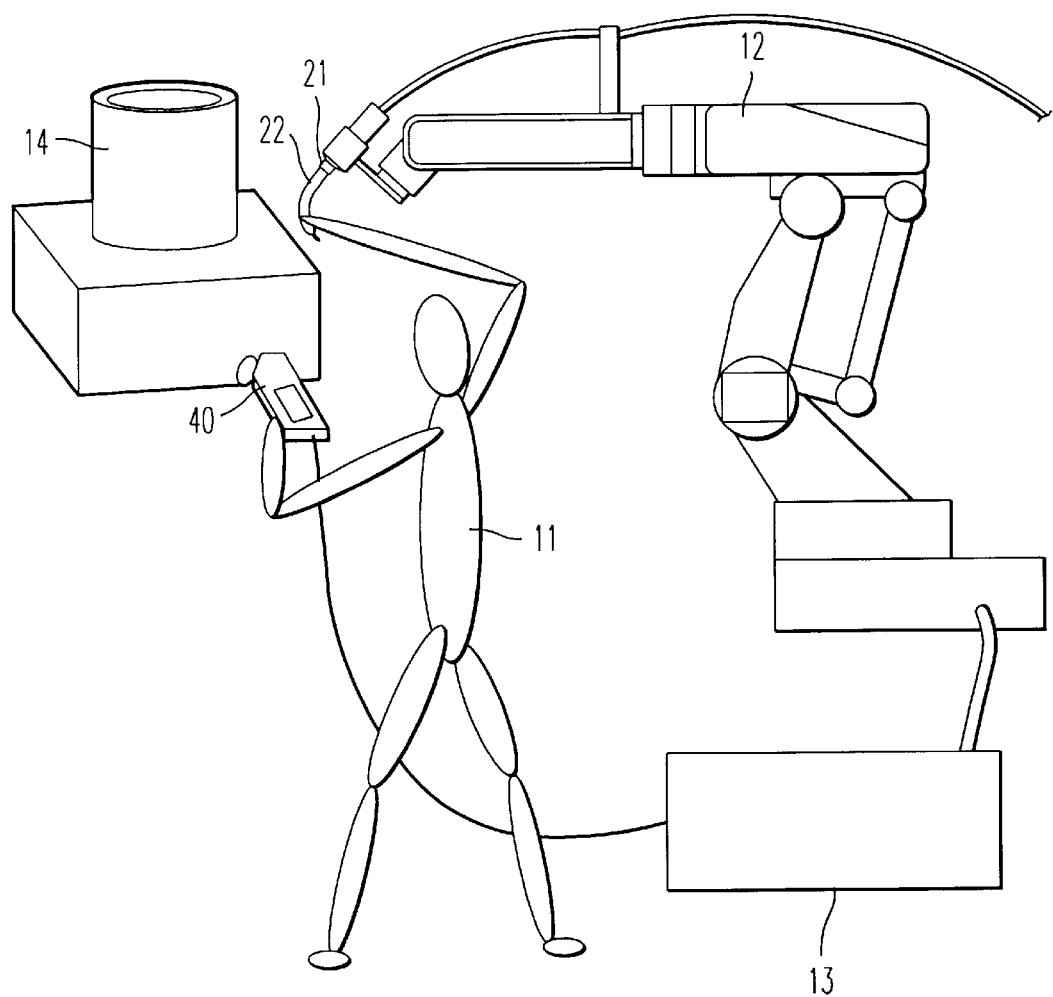
FIG. 8 is a perspective view of the welding work showing still another embodiment of the present invention.

FIG. 7 and FIG. 8 are perspective views each showing a state of welding work in the direct teaching method of the robot of the present invention.

Operator 11 fixedly attaches teaching tool 21 to the wrist portion or the like of robot 12, and then supplies the servo power by holding servo power retention switch 41 on simple teaching apparatus 40. Operator 11 performs teaching of the working point on working object 14 by holding exclusive handle 23 fixed to force detector 22 and leading thereof toward the optional direction as shown in FIG. 7, or by holding welding torch 1022 which serves as working tool 20 fixed to force detector 22 and leading robot 12 toward the optional direction as shown in FIG. 8.

It is to be noted that data from force detector 22, directives from simple teaching apparatus 40, and data from articulation angle detector 32 attached to each driving shaft of robot 12 are all stored in robot controller 13, and arithmetic is performed there to issue a directive for driving robot 12.

As described above, according to the direct teaching apparatus of the industrial robot of the present invention, the torque generated by the driving portion is controlled to the required minimum value for moving the arm itself, and hence even if excessive force of the operator is applied to the force detector, there is no danger that the robot will move being driven by the excessive torque. Further, even if the operator is caught between the arms of he robot or between the arm and the work, the force catching the operator is not excessively large so that the operator can easily escape by his own force, and accordingly the operator can perform the teaching operation in safety. Further, since the operator has, in addition to the teaching tool, the simple teaching apparatus with a servo power retention switch, the operator can stop the motion of the robot freely on his own decision.

Figure 9:
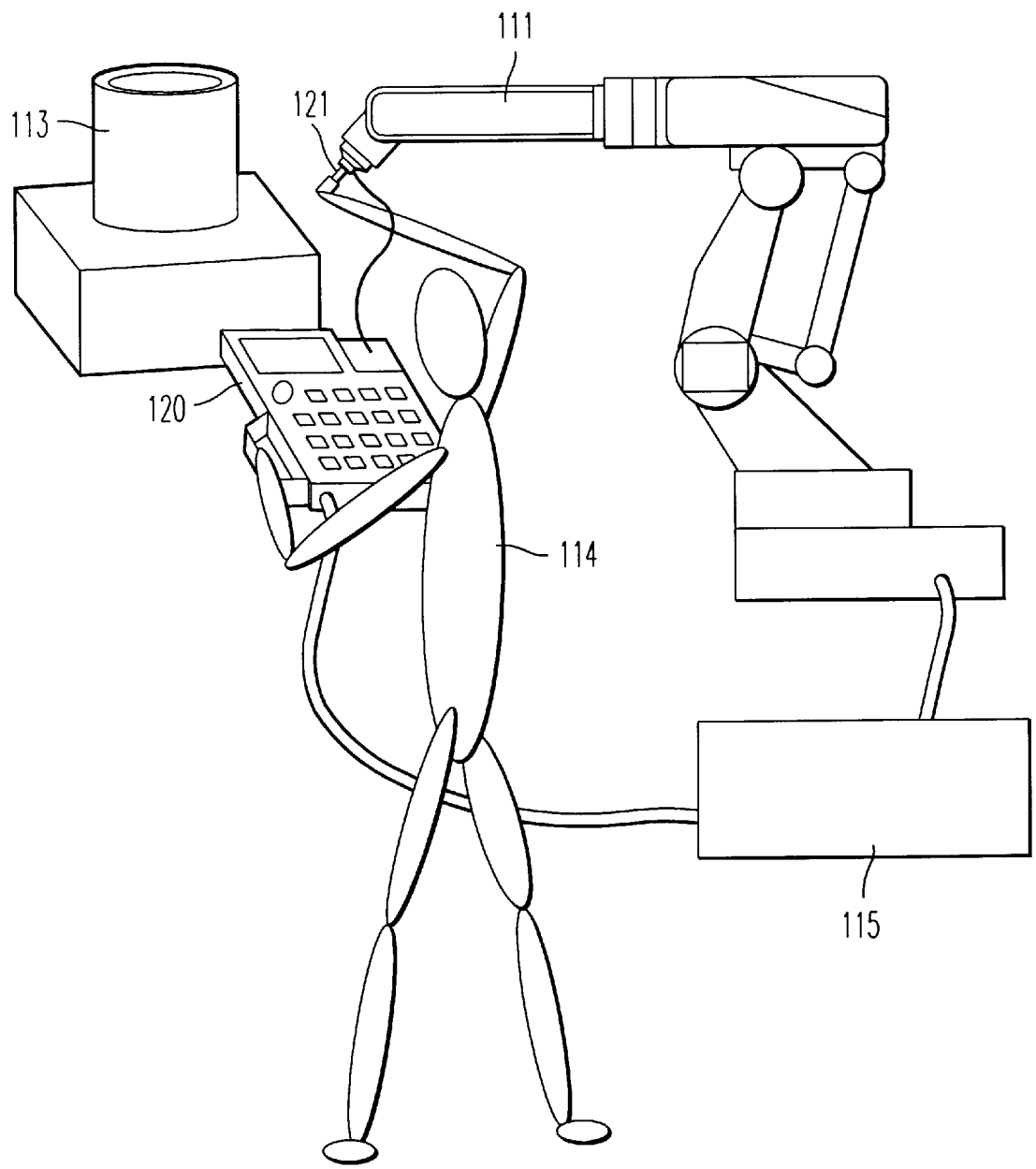
FIG. 9 is a perspective view of a teaching apparatus used in the direct teaching operation and showing another embodiment of the present invention.
Figure 10:
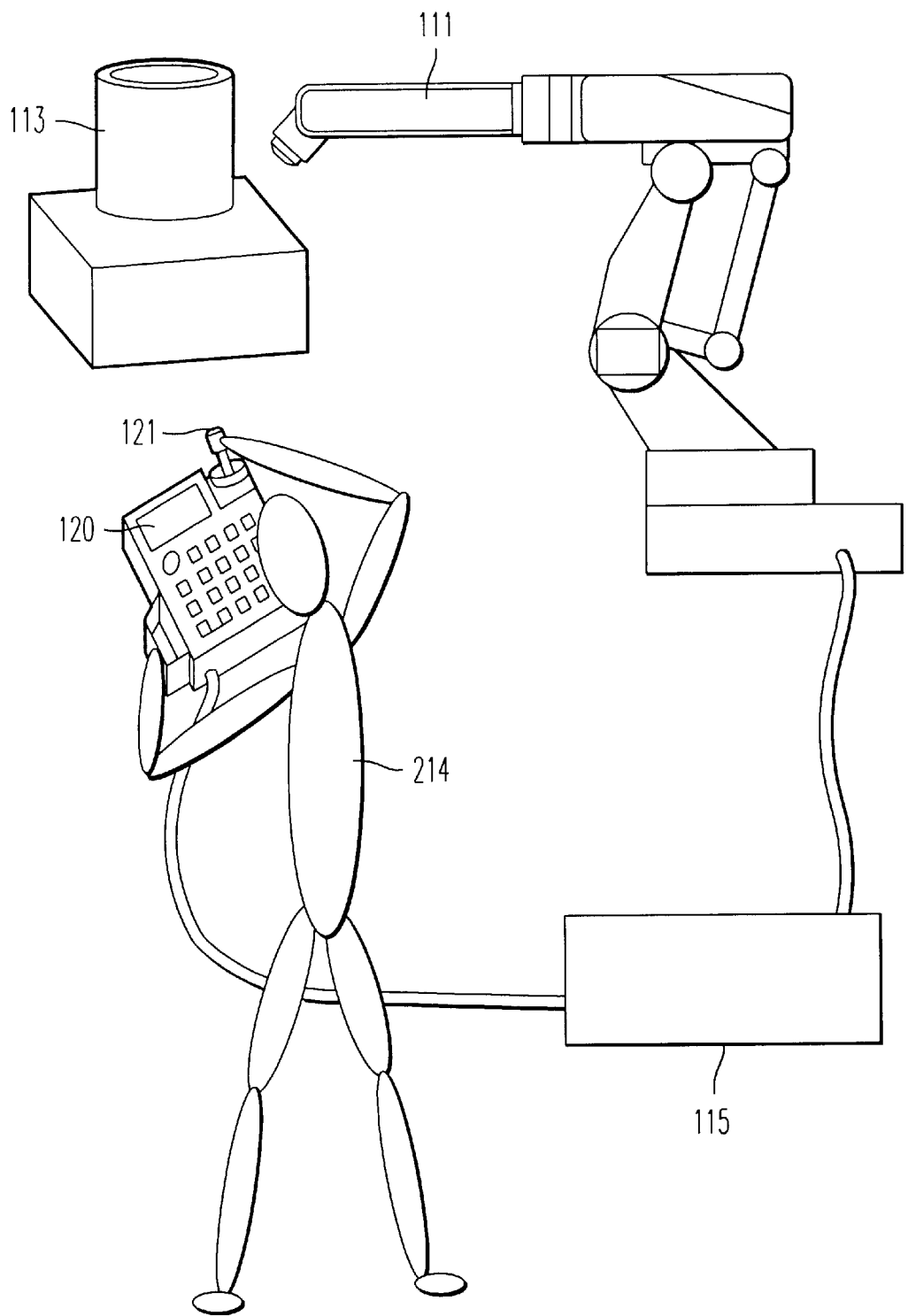
FIG. 10 is a perspective view of a teaching apparatus used in the indirect teaching operation and showing another embodiment of the present invention.

Next, a third embodiment of the present invention will be described. A direct teaching apparatus of the robot according to the present embodiment comprises, as shown in FIG. 9 and FIG. 10, a force detector, teaching tool 121 composed of a handle which is fixed to the detection terminal of said force detector and held and manipulated by the operator, teaching manipulator 120 in which said teaching tool 121 can be housed or attached thereon, a force detector lead wire connecting said teaching tool 121 and said teaching manipulator 120, and means for controlling force based on said force detector data.

This teaching apparatus further comprises means for performing the direct teaching by separating teaching tool 121 from teaching manipulator 120 and attaching to a hand or an arm or a working tool of robot 111, and means for performing the indirect teaching by attaching teaching tool 121 to teaching manipulator 120.

The concrete constitution of the present embodiment will be described below. First, a teaching apparatus shown in FIG. 11 will be described.

Figure 11:
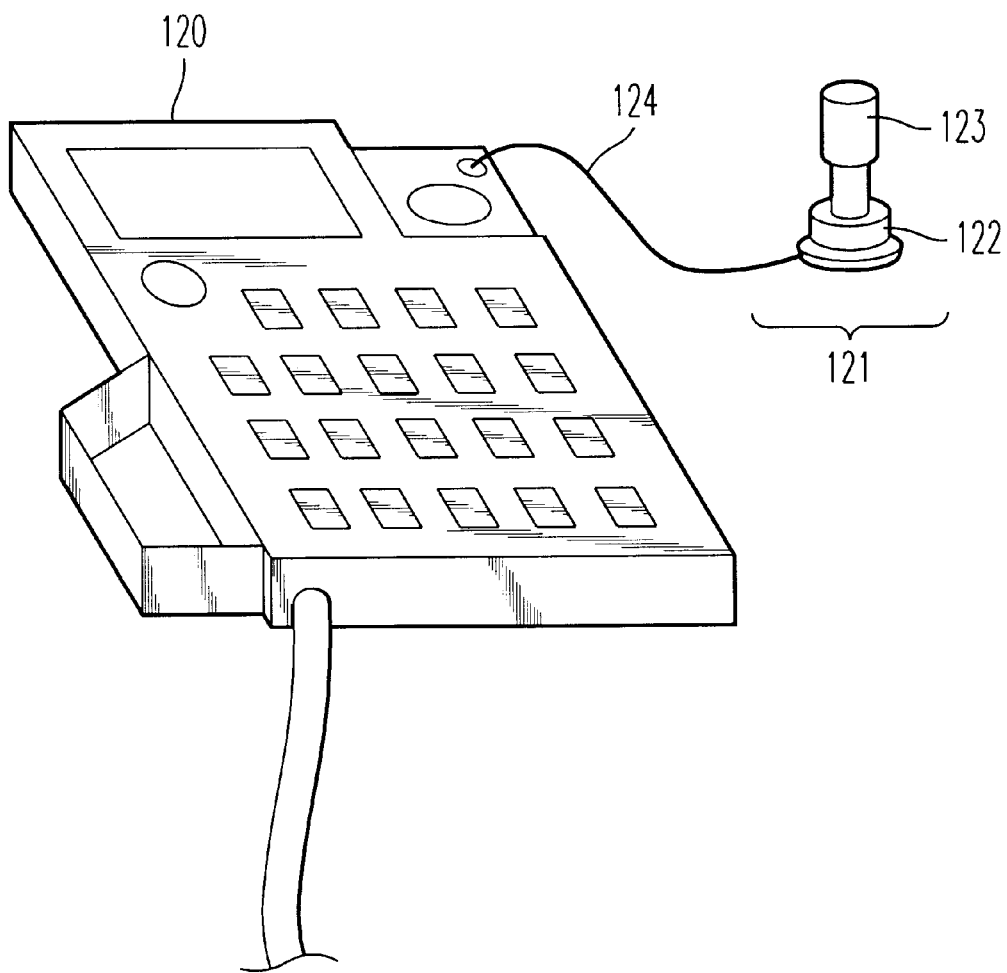
FIG. 11 is a perspective view of a teaching apparatus showing another embodiment of the present invention.

In FIG. 11, teaching tool 121 is composed of force detector 122 and handle 123 fixed to the detection terminal of force detector 122 for being held and manipulated by operator 114. Teaching tool 121 is connected with teaching manipulator 120 by means of force detector lead wire 124 and can be housed or attached on teaching manipulator 120. Also, teaching tool 121 may be attached to the wrist or the arm or the working tool and the like of robot 111 by means of the other end of the force detector. Further, a translational/rotational direction change-over switch not shown is provided on teaching tool 121 or teaching manipulator 120.

The present embodiment structured as above will be described with reference to FIG. 12 and FIG. 13. The contents of the operation will be described below using a welding robot employed particularly for welding a cylindrical pipe on a flat plate as an example.

Figure 12:
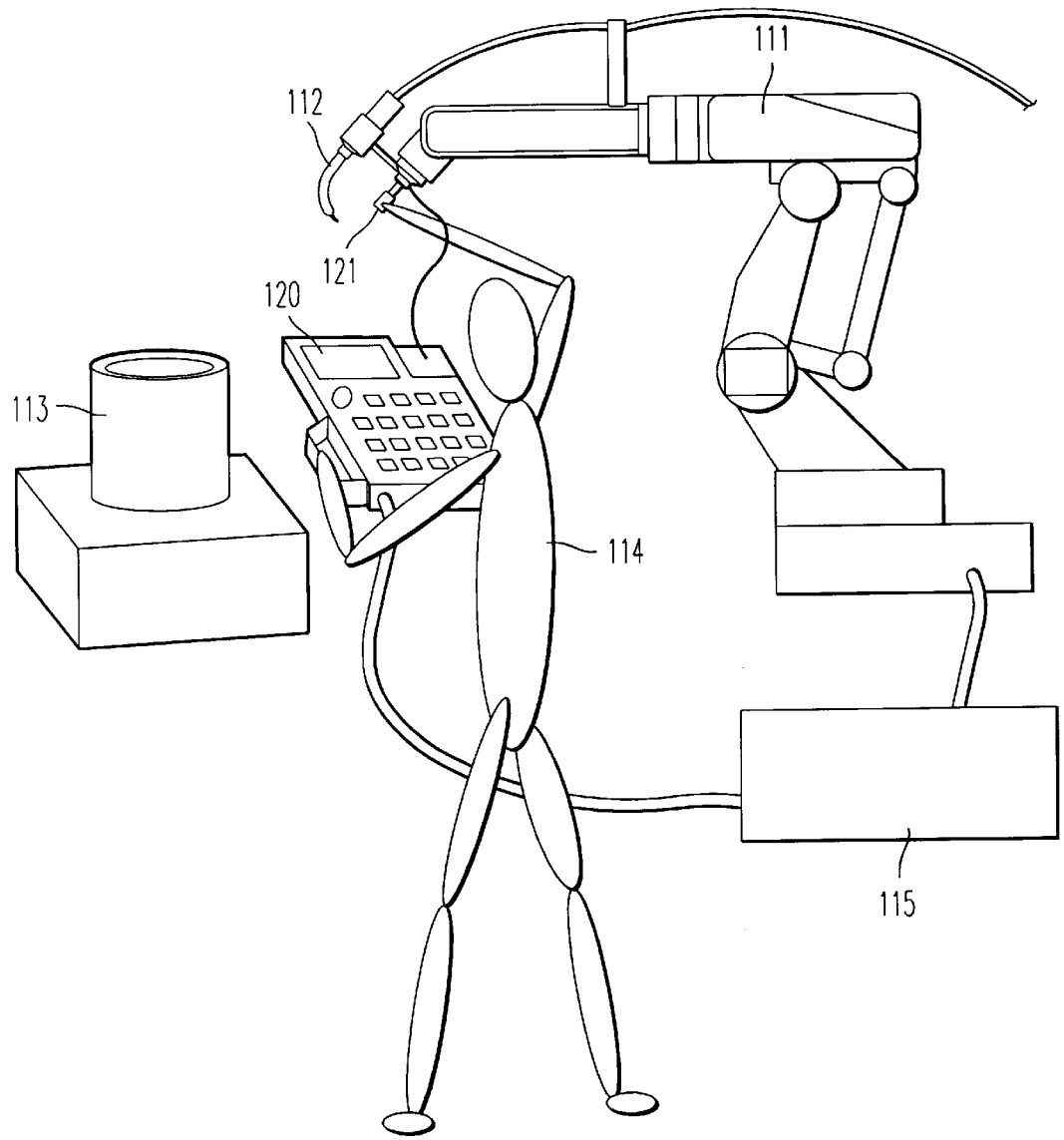
FIG. 12 is a perspective view of the welding work in the direct teaching operation and showing another embodiment of the present invention.

FIG. 12 shows a state in which teaching of the welding line is performed according to the direct teaching method. In this case, operator 114 first detaches teaching tool 121 from teaching manipulator 120, draws out a force detector lead wire, and fixedly attaches the other and of force detector 122 to a portion of the wrist or the arm or welding torch 112 or the like of robot 111. Next, operator 114 holds handle 123 (see FIG. 11) of teaching tool 121 and by applying force to handle 123 in the arbitrary direction, leads robot 111 to teach the working point.

Figure 13:
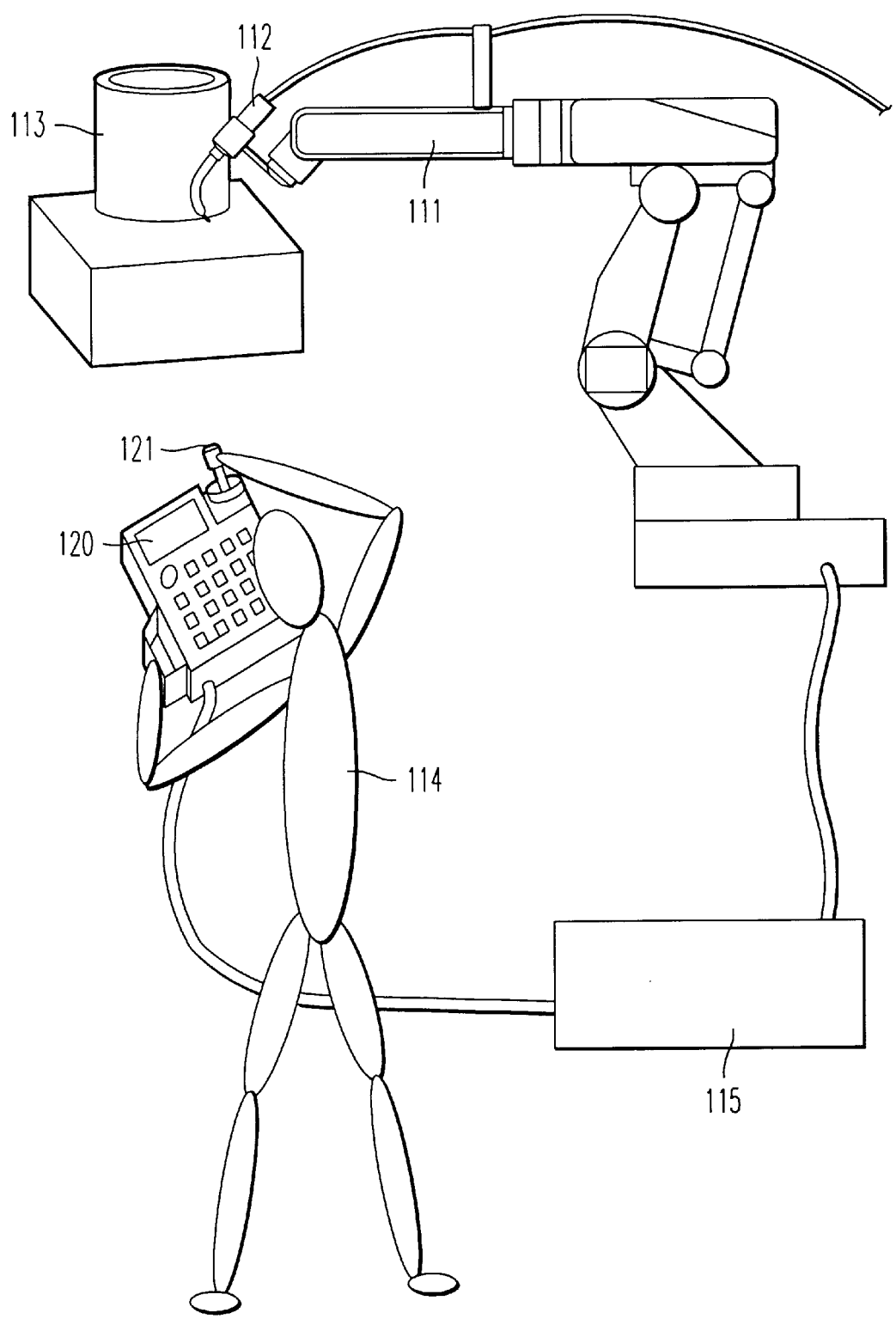
FIG. 13 is a perspective view of the welding work in the indirect teaching operation and showing another embodiment of the present invention.

FIG. 13 shows a stale in which teaching of the welding line is performed according to the indirect teaching method. In this case, operator 114 first fixedly attaches the other end of the force detector of teaching tool 121 onto teaching manipulator 120. Then operator 114 holds the handle of teaching tool 121 and by applying force to handle 123 in the particular direction on teaching manipulator 120, leads robot 111 to teach the working point.

After determining the welding attitude of welding torch 112, by switching the translational/rotational direction change-over switch to the translational direction, it becomes possible to lead robot 111 only in the translational direction without changing the welding attitude of welding torch 112.

Similarly, after determining the welding position of welding torch 112, by switching the translational/rotational direction change-over switch to the rotational direction, it becomes possible to change only the attitude of robot 111 without changing the welding position of welding torch 112. Thus teaching of the welding line of a complicated configuration can be performed easily and correctly in a reduced time.

Figure 14:
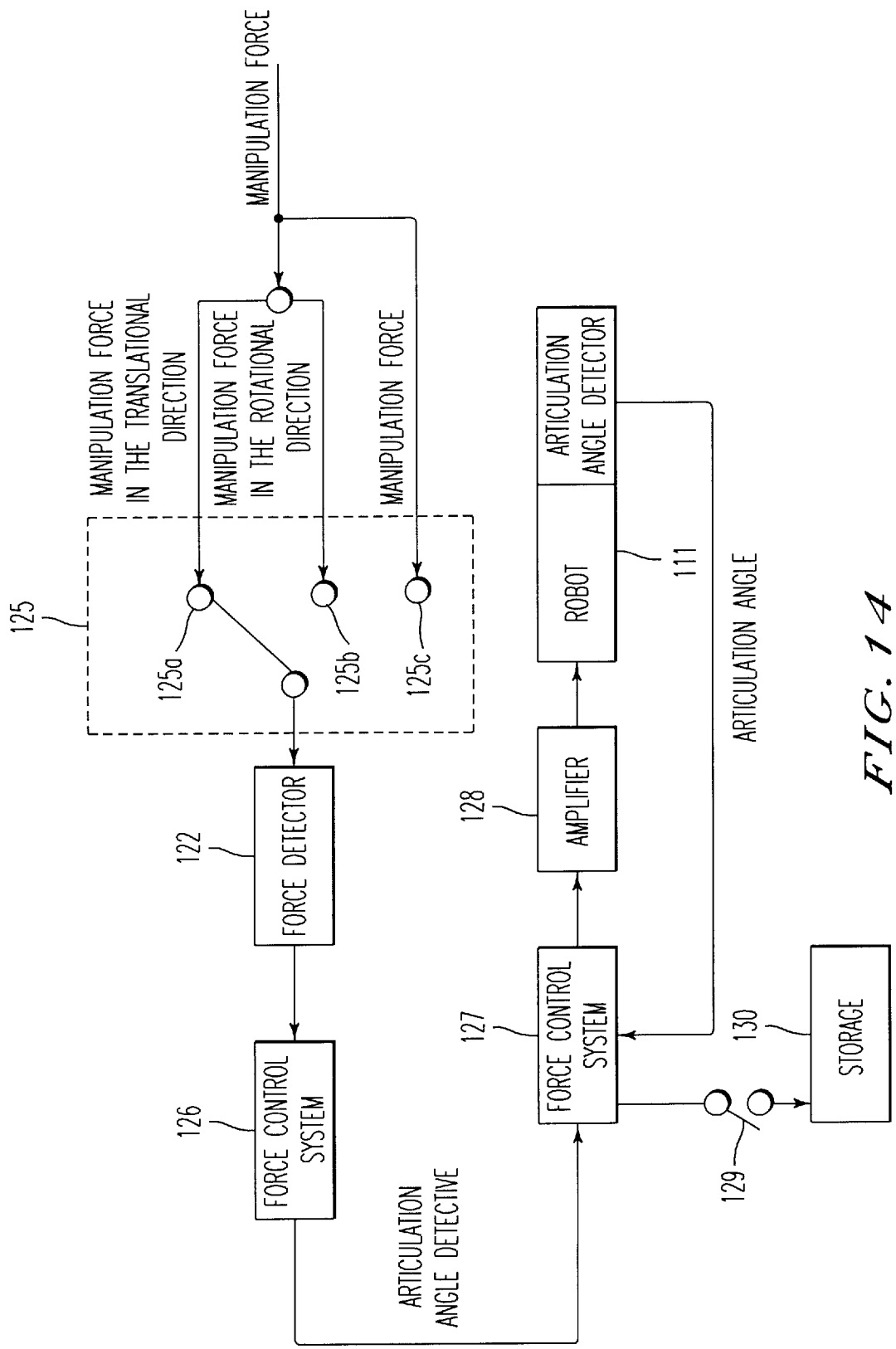
FIG. 14 is an explanation diagram of a control system of another embodiment of the present invention.

FIG. 14 is a view showing a structure of a control system of the present embodiment. The control system of the present embodiment will be described with reference to FIG. 14. (See other figures for symbols not shown in this figure).

Contact force produced at the time when handle 123 of teaching tool 121 was forced to contact with work 113, and manipulation force in the translational direction and in the rotational direction produced when operator 114 holds and manipulates the handle, are detected by force detector 122 of teaching tool 121, and the sum of the contact force and the manipulation force is transformed by force control system 126 into an angle directive for each articulation. Angle directives are inputted to position control system 127 to drive robot 111 through amplifier 123.

Here, for teaching the working point in space, the manipulation force of the operator in the translational direction and the rotational direction are inputted into force detector 122 by switching translational/rotational direction change-over switch 125, force control in the translation direction and in the rotational direction are performed corresponding to these force thereby leading the robot to teach the working point.

A role of force translational/rotational direction control change-over switch 125 is to fix the position or attitude. For example, if manipulation force 125a in the translational direction is selected, the rotational direction (attitude) is fixed and hence this mode is selected when the position of the work is moved while fixing the attitude. If manipulation force 125b in the rotational direction is selected, the translational direction (position) is fixed and hence this mode is selected when the attitude of the work is changed while fixing the position. If manipulation force c is selected, then the manipulator leaves both the position and attitude unfixed and hence this mode is selected to make both the position and the attitude change. With the selection as above, it becomes possible to perform the teaching of the working tool only for the position or only for the attitude with reference to the work.

Enter key 129 sores position/attitude data into storage 130 in the robot controller only when the key 129 is pushed, and is provided as a switch on the teaching manipulator 120 or handle 123.

When the operator teaches the working point on the work, said manipulation force and the contact force produced when handle 123 makes contact with work 113 are detected by force detector 122, and then force control is performed corresponding to the sum of both force to lead the robot for teaching the working point.

It is to be noted that it is allowable to dispose translational/rotational direction change-over switch 125 behind force detector 122.

In the present embodiment structured as above, when teaching of the working point is performed with the direct teaching method, the operator detaches the teaching tool from the teaching manipulator and fixes its to the wrist or the arm or the working tool and the like of the robot, and by holding and moving the handle of the teaching tool in the optional direction, leads the robot in accordance with the manipulation force thereby performing the teaching of the position and the attitude of the working tool.

When teaching of the working point is performed with the indirect teaching method, the operator attaches the teaching tool to the teaching manipulator and by holding and moving the handle of the teaching tool in the particular direction, leads the robot in accordance with the manipulation force thereby performing the indirect teaching of he position and the attitude of the working tool. Further, by switching the force control between the manipulation force in the translational direction and the manipulation force in the rotational direction on the teaching apparatus, it becomes possible to perform teaching of the working tool only for the position or only for the attitude with reference to the work. Therefore, teaching manipulation becomes simple without requiring any skill and the physical/mental fatigue of the operator is considerably reduced.

Further, when one teaching tool is commonly used among a plurality of robots, it becomes unnecessary to lay the wiring from the teaching tool to respective robot controllers directly, thereby allowing the construction of teaching apparatus of a simple structure and of a low cost.

Figure 15:
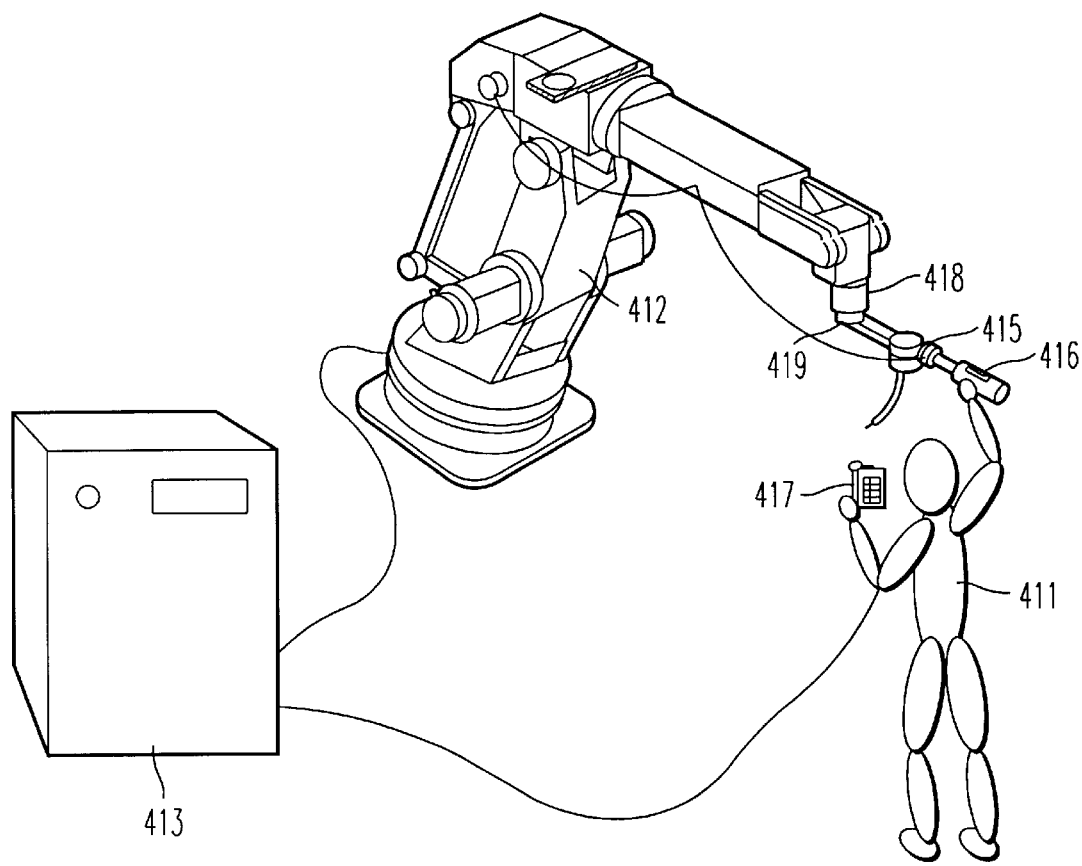
FIG. 15 is a perspective view showing a basic structure of another embodiment of the present invention.

Next, a fourth embodiment of the present invention will be described. The teaching apparatus of the present embodiment comprises, as shown in FIG. 15, force detector 415, teaching handle 416 fixed to said detector and held by the operator for leading the robot, and simple teaching apparatus 417. On simple teaching apparatus 417, there are provided an input switch for inputting data such as the position of the robot and means for showing the state of the robot.

Figure 16:
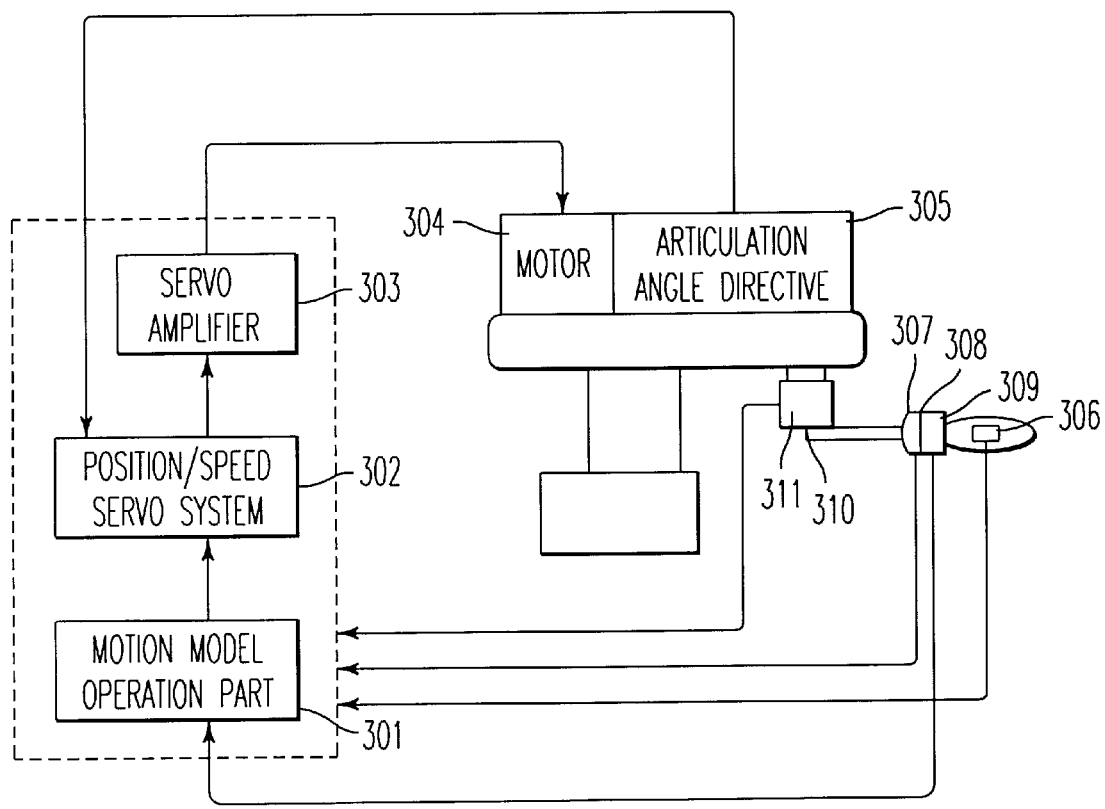
FIG. 16 is a block diagram showing a structure of a control system of another embodiment of the present invention.

FIG. 16 is a block diagram showing a structure of a control system for computing positional data or a speed directive based on the output data of force detector 415 and a motion model.

The control system shown in FIG. 16 comprises motion model operation part 301, speed/position servo system 302 for computing motor generation torque based on said positional data or said speed directive, compliance mechanism 310 which produces a buffering effect of such as that of a RCC (Remote Center Compliance) mechanism or a floating mechanism being provided between teaching handle 416 (FIG. 15) and the tip of the robot or a fixed position on the working tool to be used for attaching the teaching handle, means 311 for changing a signal at the time when said compliance mechanism is subjected to a fixed amount of displacement, and means for stopping the motion of the robot upon receiving said signal.

Also, the above teaching apparatus is structured such that, after the robot is urgently stopped by the electric brake, mechanical braking operation will not be applied to the three wrist shafts and a shaft on which gravity has no effect.

Further, the above teaching apparatus includes manipulation buttons 306 provided on teaching handle 416, means 308 disposed between 306 and 307 for recognizing that teaching handle 416 is attached to the tip of the robot or to the fixed place on the working tool, and means 307 for attaching the teaching handle onto said simple input unit.

Figure 17:
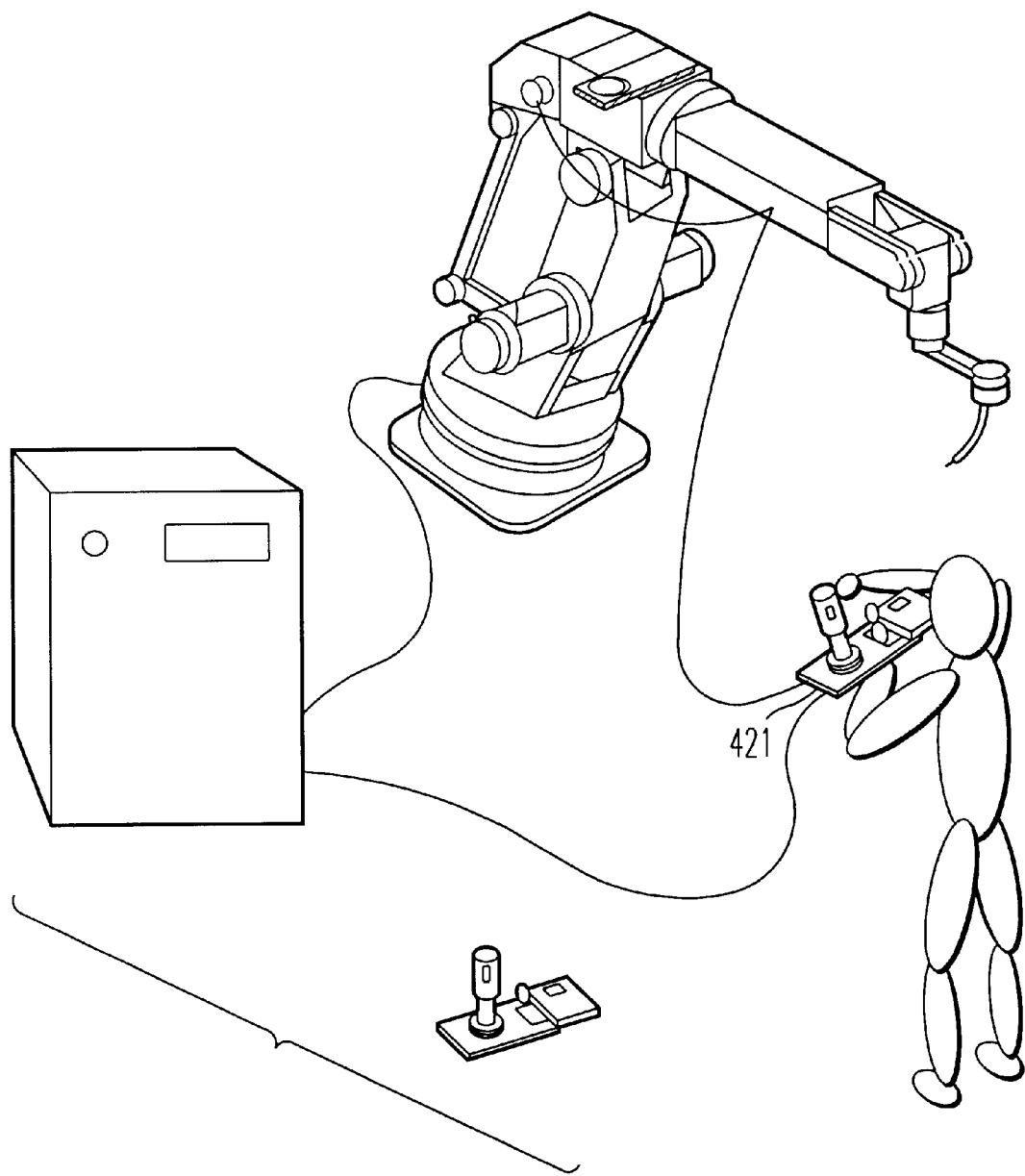
FIG. 17 is a perspective view showing the remote control operation of another embodiment of the present invention.

FIG. 17 shows the state in which the teaching handle is detached from the robot to manipulate and also shows a structural mechanism in which a teaching handle attachment recognition switch can be manipulated by means of a remote manipulation jig 421.

The embodiment of the present invention will be described below in detail. First, a simple teaching apparatus which is used in the direct teaching of the present embodiment will be described with reference to a plan in FIG. 18(*a*) and a perspective view in FIG. 18(*b*) which show the simple teaching apparatus set in a jig which is used in remote manipulation.

Simple teaching apparatus 461 is of approximately palm size and structured such that the operator can manipulate each switch holding it by one hand (since the other hand of the operator must hold a later described teaching handle, the simple teaching apparatus must be of a one-hand portable size). Here, each switch means servo power retention switch 464, emergency stop button 465, input switch 466, memory data editing key 467, and further state indication lamp 468 is also included therein.

The operator can input the servo power by holding servo power retention switch 464 with a fixed level of force. By continuously holding the switch during teaching operation, servo power active condition can be maintained. Also, when the operator feels danger during the direct teaching operation, operator 411 can stop the motion of the robot by releasing the hold of servo power retention switch 464 or by pushing emergency stop button 465.

Input switch 466 is provided for storing the position of the robot in the controller only when the switch is pushed with the position data of just that time, and hence it is pushed every teaching time at every teaching position.

Memory data editing key 467 is used for performing editing such as addition, change or erasing of storage data. By using this key, it becomes possible to perform such as editing of teaching points.

State indication lamp 462 is a lamp for indicating that teaching is in progress.

With the teaching apparatus structured as above, when the operator performs direct teaching of a working point by holding the teaching tool and the simple teaching apparatus thereby leading the robot, the robot never moves contrary to the operator's intention so far as the manipulation button on the teaching handle is not pushed. Also when the signal from the handle attachment recognition switch is not inputted, the robot does not move. Moreover, when the signal from a displacement switch which belongs to the compliance mechanism is changed, the robot's motion is suddenly stopped. Further, by attaching the teaching handle to he simple teaching apparatus, it becomes possible to perform remote control. In addition, since no mechanical brake is activated after the robot is stopped by the electric brake in an emergency mode, there is no risk that the operator is kept constrained between the robot and the work.

Next, the teaching handle to be used in the direct teaching of the present invention will again be described with reference to FIG. 16.

The teaching handle is structured such that it has a form which can fast be grasped by hand having a manipulation button provided on a grip, and the operator can move the robot by pushing the manipulation button. Also on a handle attachment jig portion, there is provided a handle attachment recognition switch, and with which a signal can be recognized only when the teaching handle is attached.

Next, the compliance mechanism to be used in the direct teaching of the present invention will be described. The compliance mechanism is provided between the teaching handle and the tip of the robot or between the working tool attached with the teaching handle and the tip of the robot. When the signal from a switch or a sensor incorporated in the compliance mechanism is changed due to a fixed amount of displacement of the compliance mechanism, motion of the robot is immediately stopped.

Figure 18A:
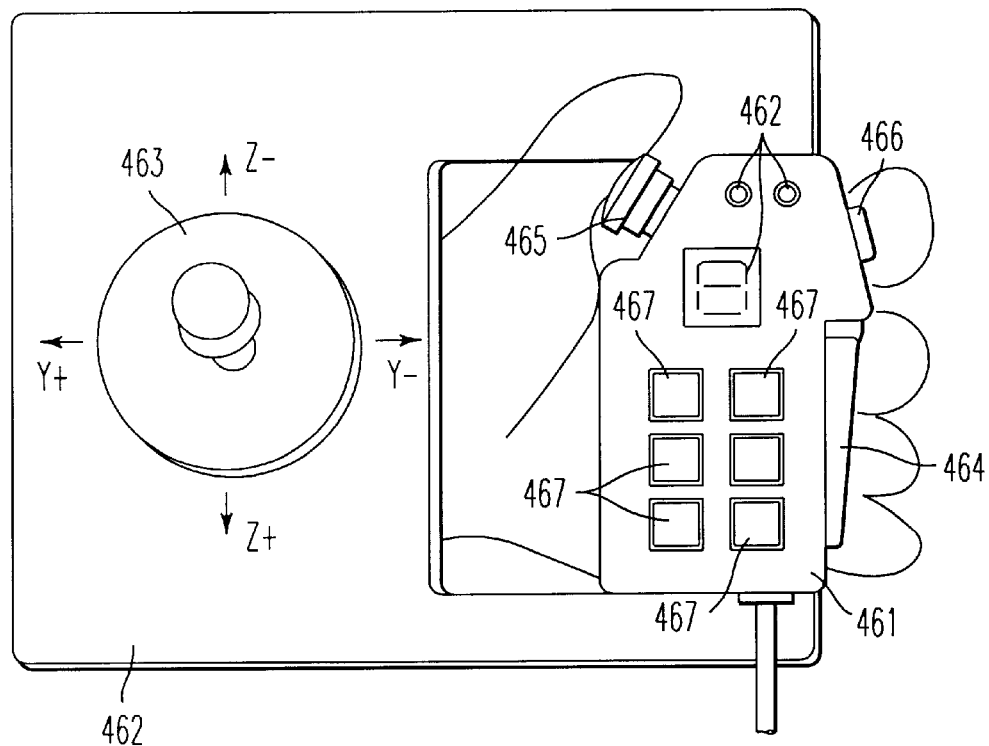
FIGS. 18(a) and 18(b) are views showing a simple teaching apparatus and a remote control jig of another embodiment of the present invention, respectively.
Figure 18B:
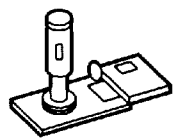

Next, a remote manipulation jig to be used for direct teaching of the present invention will be described with reference to FIG. 18.

The remote manipulation jig is structured so that a simple teaching apparatus and a teaching handle can be attached thereon, and also has a structure which allows the operator to easily hold the simple teaching apparatus by one hand and performs remote control of the robot by using the teaching handle by the other hand.

FIG. 16 is a block diagram showing a control system of the present invention. The control method executed in the embodiment will be described below. According to the control method of the present embodiment, force detector 309 detects the leading force of teaching handle 306 held by the operator, and based on the detector detection data, motion model operation part 301 computes the position directive on the rectangular Cartesian coordinate system which is established according to the motion model prepared by using imaginary inertia and viscosity. Motion model operation part 301 further inversely transforms the computed position directive to the data on a revolute mode system to obtain an articulation angle directive of each articulation. Position/speed servo system 302 calculates the motor generation torque based on this articulation angle directive and the articulation angle as well as the articulation speed detected by articulation angle detector 305 provided on each driving unit or on each articulation part of the robot, and accordingly the servo motor of the robot is driven by the servo amplifier.

When the operator leads the tool portion of the robot to a working point of a working object and pushes the input switch provided on the simple teaching apparatus, teaching of the working point is performed with reference to the working object.

Figure 19:
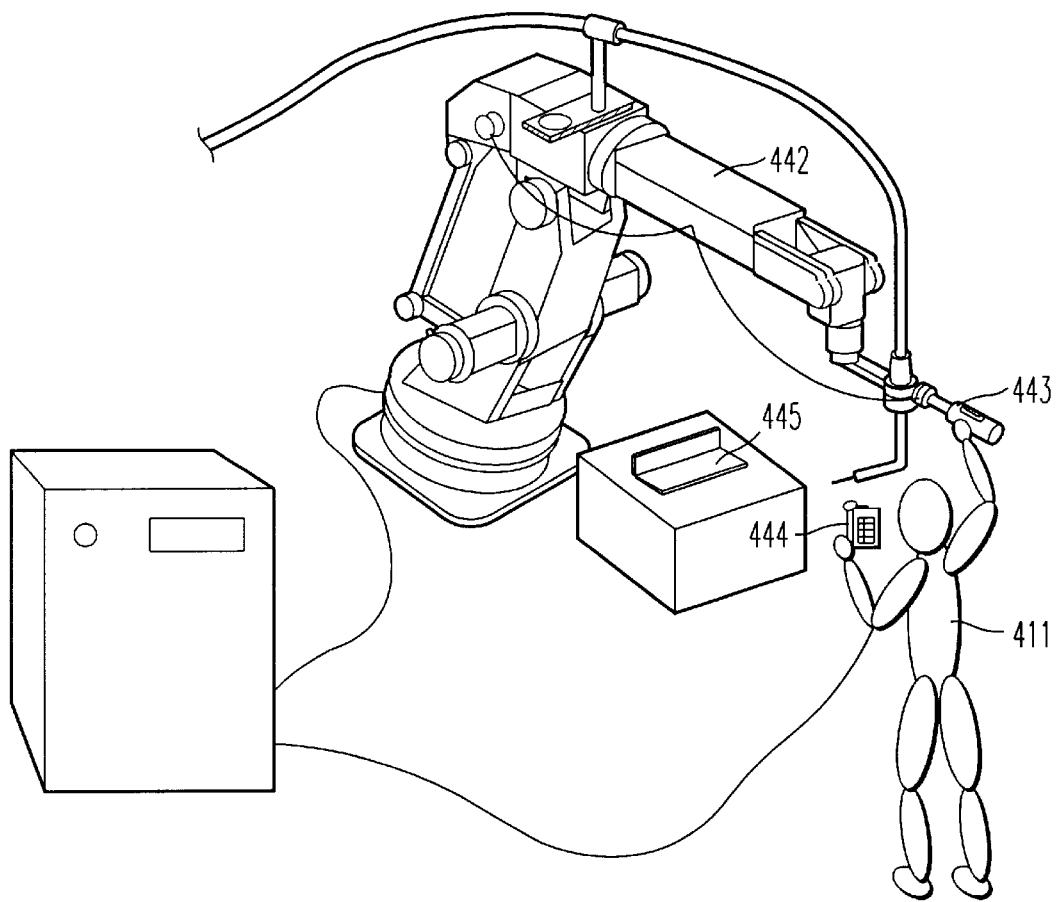
FIG. 19 is a perspective view of the welding work showing another embodiment of the present invention.
Figure 20:
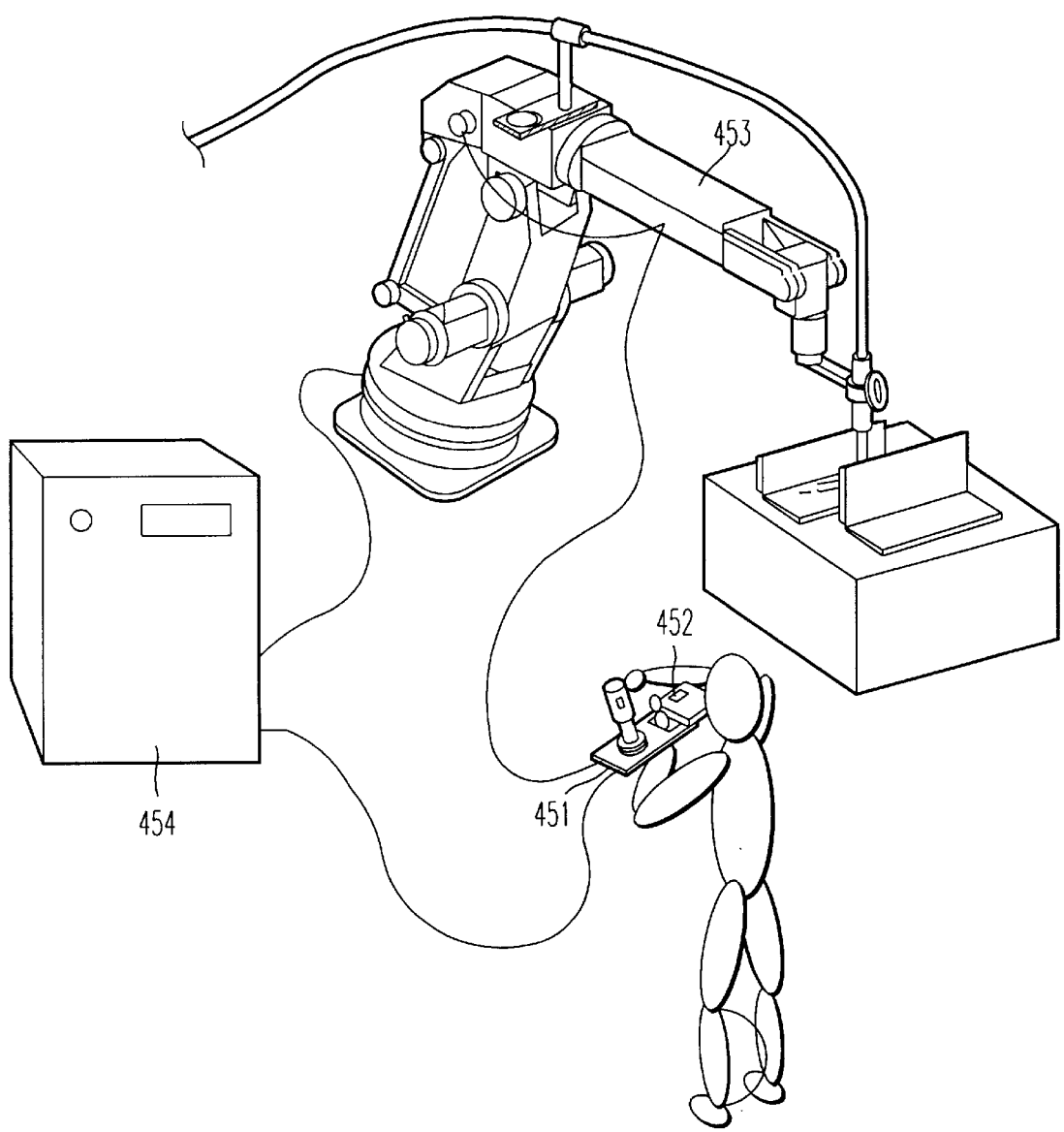
FIG. 20 is a perspective view of the welding work showing still another embodiment of the present invention.

FIG. 19 and FIG. 20 show embodiments of the welding work in the direct teaching method of the robot of the present invention. Operator 441 fixedly attaches teaching handle 443 on the welding torch or the like provided at the wrist portion of robot 442, and then supplies the servo power by holding the servo power retention switch (464 in FIG. 18) on simple teaching apparatus 444. If there is no change in the signal from the handle recognition switch, the servo power can not be inputted.

As shown in FIG. 19, it becomes possible for the operator to lead the robot by holding the teaching handle fixed to the force detector and pushing the manipulation button, and after leading the robot, the operator performs teaching of important points of working object 445 which is to be welded. At this time, if the welding torch or the teaching handle makes contact with the working object, the compliance mechanism provided between the wrist portion of the robot and the welding torch is deformed by the force, thereby preventing deformation of the welding torch or the teaching handle, and at the same time according to a signal outputted from the compliance mechanism when its deformation reaches a fixed level, the motion of the robot is stopped.

When the configuration of the working object is complex and there is a probability of danger such as that the operator's arm may come into contact with another object when teaching is performed with a teaching handle fixed to the welding torch, the teaching handle is detached from the handle attachment jig on the welding torch and attached to a remote manipulation jig together with the simple teaching apparatus (FIG. 20). Then the operator holds the simple teaching apparatus on the remote manipulation jig by one hand and holds the teaching handle by the other hand to perform remote control for leading the robot for performing the teaching of the working point.

Further, the data from force detector 451, the directives from simple teaching apparatus 452, the data from the articulation angle detector attached to each driving shaft of robot 453 are stored in robot controller 454, and processed there to drive the robot.

As described above, according to the present embodiment, when the operator holds the teaching tool and the simple teaching apparatus and leads the robot to perform the direct teaching of the working point, even if the output force is released from the force detector, the robot never moves contrary to the operator's intention so far as the manipulation button on the teaching handle is not pushed. Also even if the teaching handle is not attached by a miss, when the signal from the handle attachment recognition switch is not inputted, the robot does not move. Further, even if the handle or the working tool makes contact with the work or the like, then the signal from a switch or a sensor of the compliance mechanism is inputted to urgently stop the motion of the robot. Moreover, when the teaching is performed for a narrow portion, by attaching the teaching handle to the simple teaching apparatus, it becomes possible to perform the remote control. In addition, if the worst case occurs such that the operator is caught by the robot at the time of emergency stop, by previously preparing the system that no mechanical brake is activated in such a case, the operator can easily escape from the robot. Therefore, with this embodiment, the operator can perform the direct teaching in extreme safety to the good effect of the present invention.

Figure 21:
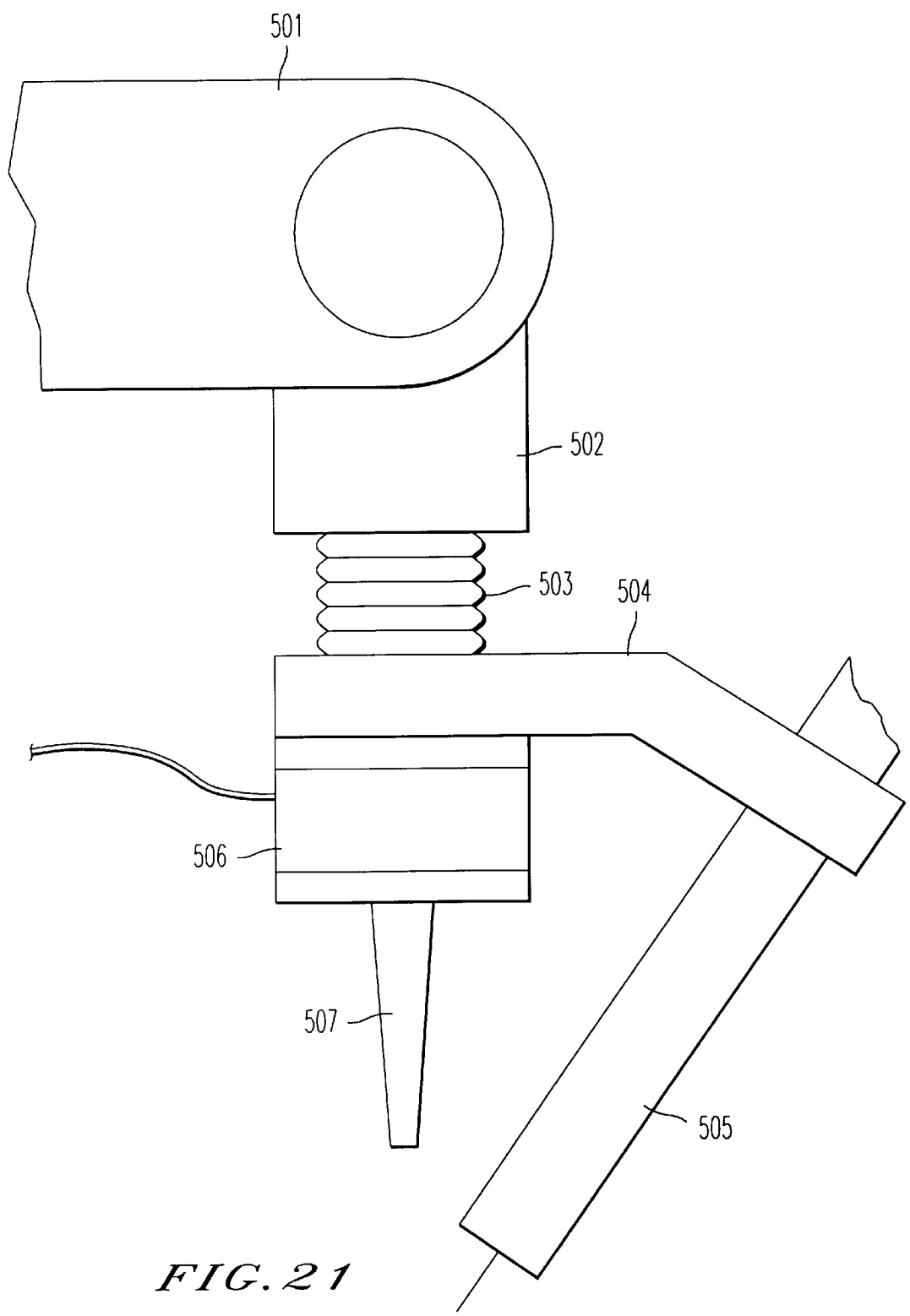
FIG. 21 is a view showing another embodiment of the present invention.

Subsequently, another embodiment of the present invention will be described. FIG. 21 is a view showing a structure of another embodiment of the present invention.

In FIG. 21, numeral 501 is a robot, 502 a wrist of the robot, 503 a compliance mechanism, 504 a tool support, 505 a tool (for example, a welding torch), 506 a force sensor and 507 a teaching handle.

Wrist 502 of the robot is a movable shaft disposed at the tip of robot 501, and tool support 504 may be attached here according a case, however in this embodiment, tool support 504 is attached through compliance mechanism 503. Compliance mechanism 503 has the elasticity to return, after collision, to the original position, and for example, it is made of a spring or the like. Tool support 504 may be of a type which is formed in a unit with tool 505, constituting a part of tool 505.

Tool support 504 is attached with an integrated unit comprising force sensor 506 and teaching handle 507. However, as described later, this integrated unit is made with a mechanism to be detachable (such as a screw type or a hook type unit which can be attached/detached by hand without using any tool is allowable) at the time of playback operation.

Force sensor 506 detects the force (direction and magnitude) to be applied by the operator to teaching handle 507 held by the operator, and includes the function to send the force data through signal line 508 to a robot controller not shown in the figure. Since the robot controller controls the motion of robot 501 in the direction of the force, the operator performs teaching of the working position by applying force to teaching handle 507 with one hand in the direction he wants to make the robot move. In this case, by pushing a switch button not shown by the other hand, the position of motion at the time when the switch is pushed is inputted in the memory of the robot controller and stored as the teaching position.

By the way, with an apparatus of this kind, when tool 505 has collided with the work during teaching operation, the elasticity of compliance mechanism 503 absorbs the energy of collision and protects tool 505 and force sensor 506. Further, when the teaching operator falls holding the teaching handle, although an excessive load is applied to the teaching handle portion, also in this case the elasticity of compliance mechanism 503 absorbs the excessive load to prevent the erroneous motion of the robot. Furthermore, when operator sandwiching trouble is generated between tool 505 and the robot arm, compliance mechanism 506 absorbs the energy of the robot within its capacity to avoid a dangerous sandwiching condition.

Figure 22:
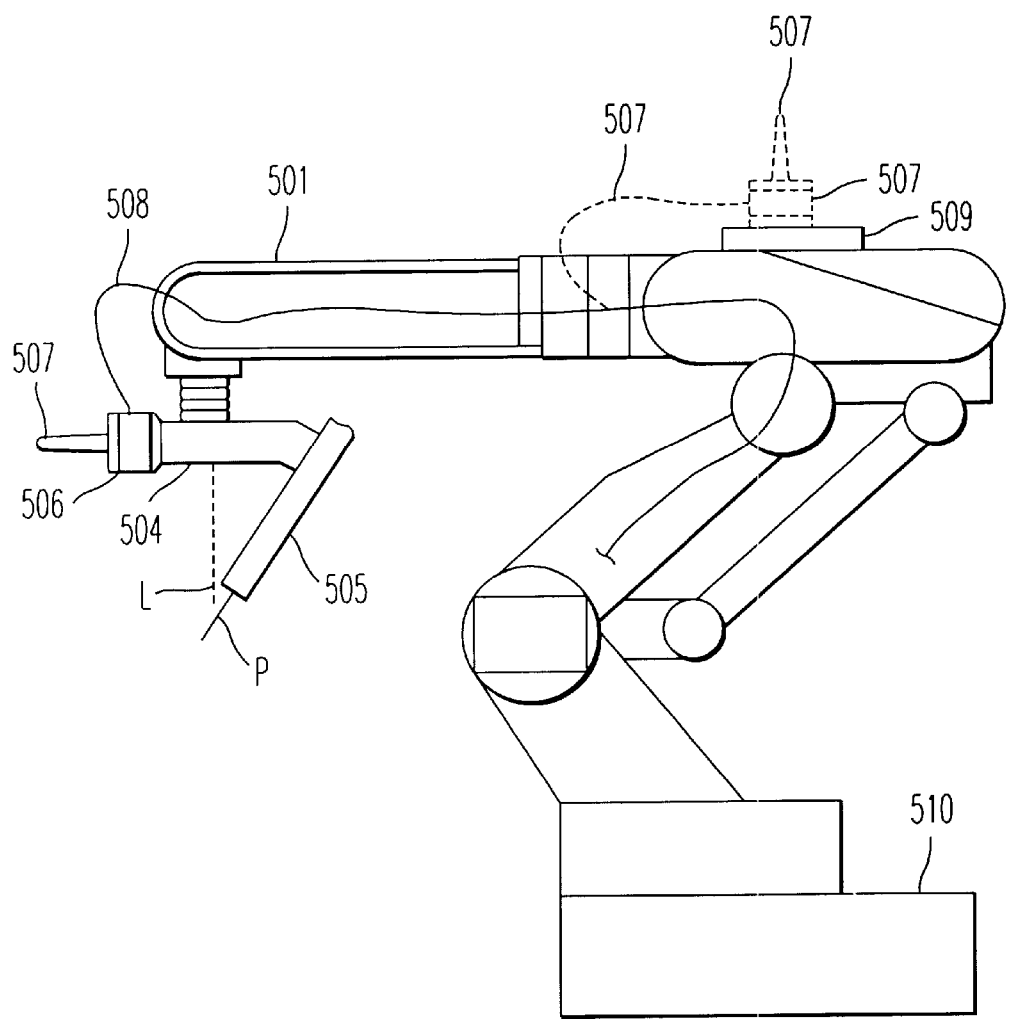
FIG. 22 is a view showing still another embodiment of the present invention.

Further, an integrated unit comprising force sensor 506 and teaching handle 507 is arranged to be detachable from tool support 504, and as shown in FIG. 22 with a dotted line, it is held at unit holder 509 provided on a part of the robot arm or on the robot controller when playback operation is in progress. By means of this arrangement, force sensor 506 is protected and the working will not be disturbed by signal line 508 of the force sensor in playback operation. In this case, compliance mechanism 503 is not always necessary and hence it can be omitted.

FIG. 22 shows an example in which teaching handle 507 is situated perpendicular to the line L connecting the tip of the wrist of the robot and the teaching point P, standing outside the robot viewed from base 510 of the robot.

By arranging the robot in this way, teaching handle 507 faces the operator standing side (generally the operator stands outside the position of the tip of the robot arm viewed from the robot base) and the direction in which the operator pushes down teaching handle 507 is usually the direction in which tool 505 approaches the work (not shown), therefore manipulation of the teaching handle becomes very easy.

As describe above and according to the present embodiment, it becomes possible, during teaching operation, to protect a tool or a force sensor or prevent the abnormal motion of the robot to be caused by the excessive load, and further since it becomes possible to avoid the danger of being sandwiched by the robot, the teaching operator can perform teaching at ease. Also since the force sensor and the teaching handle are detached in playback operation and held on the robot or on a part of the robot controller, the operator is not needed to pay consideration for the protection of the force sensor.

What is claimed is:

1. An apparatus for direct teaching of a robot by using a force detector and a teaching tool composed of one of a working tool and an exclusive handle which is fixed to said force detector and held by an operator for leading the robot, comprising:

a motion model operation unit configured to compute one of a position and a speed directive based on information outputted from said force detector and a motion model for inertia and viscosity of an arm;

a device configured to change a limit of a torque directive of a robot driving motor calculated and based on one of said position and said speed directive;

a computation device configured to calculate a friction compensation torque which acts on a driving portion of each articulation of said robot;

a computation device configured to calculate a gravity compensation torque which works on each articulation shaft of said robot; and an adder configured to add a sum of the compensation torque of said friction and the compensation torque of said gravity to the torque directive after the torque is limited by the device configured to change the limit of said torque directive.

2. An apparatus for direct teaching of a robot according to claim 1 having, in addition to said teaching tool, at least a teaching apparatus which comprises:

a servo power switch which can turn on and off power for driving the robot;

an input switch configured to enter data with reference to the position which is indicated through teaching performed by using said teaching tool;

a communication device configured to transmit and receive signals to and from a main controller of said robot; and a transfer switch which can move said robot to the position indicated by teaching.

3. An apparatus for direct teaching of a robot according to claim 1, further comprising:

a selector configured to select whether said apparatus stores, as teaching data, a position calculated and based on force detector data and whether said motion model stores, as teaching data, data of an angle detector attached to said robot driving motor.

4. An apparatus for direct teaching of a robot, comprising:

a force detector and a teaching handle fixed to said force detector and held by an operator for leading the robot;

a motion model unit configured to compute a position or a speed directive based on data of said force detector and a motion model;

a computer configured to calculate a generation torque of a motor for driving said robot based on one of said position and said speed directive;

a compliance mechanism provided between said teaching handle and one of a tip of the robot and a fixed position on a working tool to be used for attachment of the teaching handle;

a device configured to change a signal at a time when said compliance mechanism is subjected to a fixed amount of displacement; and a stopper configured to arrest motion of the robot upon receiving said signal.

5. An apparatus for direct teaching of a robot according to claim 4, wherein said stopper is arranged such that, after the robot is urgently stopped by an electric brake, a mechanical braking operation will not be applied to any wrist shafts and to a shaft which is not subject to gravity.

6. An apparatus for direct teaching of a robot according to claim 4, further comprising:

manipulation buttons configured on said teaching handle to allow the operator to move the robot.

7. An apparatus for direct teaching of a robot according to claim 4, further comprising:

a device configured to recognize that said teaching handle is attached to one of the tip of the robot and the fixed position on the working tool.

8. An apparatus for direct teaching of a robot according to claim 4, further comprising:

an input switch configured to enter data with reference to the position of said robot; and a display configured to show a state of said robot.

9. An apparatus for direct teaching of a robot according to claim 8, further comprising:

an attachment configured to hold said teaching handle together with said display in a unit;

wherein teaching of a narrow portion is performed through remote control operation performed by using the teaching handle.

10. An apparatus for direct teaching of a robot, comprising:

a motion model operation unit for the robot, a teaching handle disposed on a tip of the robot, a force sensor interposed therebetween and configured to detect a force applied to said teaching handle held by an operator, a device configured to move a robot arm in a direction of a detected force for teaching a working position, and one of a teaching tool and a holder attached through a compliance mechanism to the tip of the robot, said teaching handle being attached said to one of said teaching tool and said holder through said force sensor.

11. An apparatus for direct teaching of a robot, according to claim 10:

wherein said force sensor and said teaching handle are arranged so as to be detached from said teaching tool at a time of playback operation.

12. An apparatus for direct teaching of a robot according to claim 11, wherein the force sensor and the teaching handle are formed as an integral unit.

13. An apparatus for direct teaching of a robot according to claim 11, wherein a position on which the detached force sensor and the detached teaching handle are held during playback operation is located on one of the robot arm and a robot controller.

14. An apparatus for direct teaching of a robot according to claim 11, wherein the teaching handle is made in a shape of a joy stick and is disposed perpendicular to a line connecting a tip of a wrist of the robot and a teaching point, said teaching handle being positioned outside the robot when viewed from a base of the robot.

* * * * *